United States Patent
Zhamu et al.

(10) Patent No.: US 9,112,240 B2
(45) Date of Patent: Aug. 18, 2015

(54) LITHIUM METAL-SULFUR AND LITHIUM ION-SULFUR SECONDARY BATTERIES CONTAINING A NANO-STRUCTURED CATHODE AND PROCESSES FOR PRODUCING SAME

(75) Inventors: Aruna Zhamu, Centerville, OH (US); Bor Z. Jang, Centerville, OH (US); Zenning Yu, Fairborn, OH (US)

(73) Assignee: Nanotek Instruments, Inc.

( * ) Notice: Subject to any disclaimer, the term of this patent is extended or adjusted under 35 U.S.C. 154(b) by 592 days.

(21) Appl. No.: 12/655,597

(22) Filed: Jan. 4, 2010

(65) Prior Publication Data
US 2011/0165466 A1    Jul. 7, 2011

(51) Int. Cl.
| | |
|---|---|
| *H01M 4/13* | (2010.01) |
| *H01M 10/0525* | (2010.01) |
| *B82Y 30/00* | (2011.01) |
| *H01M 4/04* | (2006.01) |
| *H01M 4/136* | (2010.01) |
| *H01M 4/1397* | (2010.01) |
| *H01M 4/58* | (2010.01) |
| *H01M 4/62* | (2006.01) |

(Continued)

(52) U.S. Cl.
CPC ........... *H01M 10/0525* (2013.01); *B82Y 30/00* (2013.01); *H01M 4/045* (2013.01); *H01M 4/0438* (2013.01); *H01M 4/0445* (2013.01); *H01M 4/136* (2013.01); *H01M 4/1397* (2013.01); *H01M 4/581* (2013.01); *H01M 4/5815* (2013.01); *H01M 4/624* (2013.01); *H01M 4/80* (2013.01); *H01M 10/0562* (2013.01); *H01M 10/446* (2013.01); *H01M 2004/021* (2013.01); *H01M 2004/028* (2013.01); *H01M 2010/4292* (2013.01); *Y02E 60/122* (2013.01); *Y02T 10/7011* (2013.01); *Y10T 29/49115* (2015.01)

(58) Field of Classification Search
None
See application file for complete search history.

(56) References Cited

U.S. PATENT DOCUMENTS

| | | |
|---|---|---|
| 4,833,048 A | 5/1989 | Dejonghe et al. |
| 5,324,599 A | 6/1994 | Oyama et al. |

(Continued)

OTHER PUBLICATIONS

Chan Ki, Sang-Hee Park, Wan-Jin Lee, Kap-Seung Yang Characteristics of supercapaitor electrodes of PBI-based carbon U nanofiber web prepared by electrospining. Aug. 6, 2004 Electrochimic Acta.*

(Continued)

*Primary Examiner* — Patrick Ryan
*Assistant Examiner* — Jose Colucci Rios

(57) ABSTRACT

An electrochemical cell comprising an anode, electrolyte or an electrolyte/separator combination, and a nano-structured cathode, wherein the cathode comprises: (a) an integrated nano-structure of electrically conductive nanometer-scaled filaments that are interconnected to form a porous network of electron-conducting paths comprising pores with a size smaller than 100 nm (preferably smaller than 10 nm), wherein the filaments have a transverse dimension less than 500 nm (preferably less than 100 nm); and (b) powder or salt of lithium-containing sulfide (lithium polysulfide) disposed in the pores, or a thin coating of lithium-containing sulfide deposited on a nano-scaled filament surface wherein the lithium-containing sulfide is in contact with, dispersed in, or dissolved in electrolyte liquid and the lithium-containing sulfide-to-filament weight ratio is between 1/10 and 10/1 which is measured when the cell is in a fully discharged state. The cell exhibits an exceptionally high specific energy and a long cycle life.

35 Claims, 8 Drawing Sheets

(51) Int. Cl.
*H01M 4/80* (2006.01)
*H01M 10/0562* (2010.01)
*H01M 10/44* (2006.01)
*H01M 4/02* (2006.01)
*H01M 10/42* (2006.01)

(56) References Cited

U.S. PATENT DOCUMENTS

| | | | |
|---|---|---|---|
| 5,516,598 A | 5/1996 | Visco et al. | |
| 5,532,077 A | 7/1996 | Chu | |
| 6,194,099 B1* | 2/2001 | Gernov et al. | 429/213 |
| 7,247,408 B2 | 7/2007 | Skotheim et al. | |
| 7,282,296 B2 | 10/2007 | Visco et al. | |
| 2001/0028979 A1* | 10/2001 | Takami | 429/218.1 |
| 2002/0076618 A1* | 6/2002 | Amatucci | 429/324 |
| 2004/0121228 A1* | 6/2004 | Ovshinsky et al. | 429/131 |
| 2005/0191555 A1* | 9/2005 | Kelley et al. | 429/245 |
| 2006/0216222 A1* | 9/2006 | Jang | 423/448 |
| 2007/0048619 A1* | 3/2007 | Inda | 429/322 |
| 2008/0261116 A1* | 10/2008 | Burton et al. | 429/231.8 |
| 2009/0068553 A1 | 3/2009 | Firsich | |
| 2009/0075173 A1* | 3/2009 | Jeong et al. | 429/218.1 |
| 2010/0291443 A1* | 11/2010 | Farmer | 429/304 |
| 2011/0200883 A1* | 8/2011 | Cui et al. | 429/231.4 |
| 2012/0122017 A1* | 5/2012 | Mills | 429/504 |

OTHER PUBLICATIONS

U.S. Appl. No. 12/006,209, filed Jan. 2, 2008, A. Zhamu et al.
U.S. Appl. No. 12/009,259, filed Jan. 18, 2008, A. Zhamu et al.
Kang, K., Meng, Y. S., Bréger, J., Grey, C. P. & Ceder, G. Electrodes with high power and high capacity for rechargeable lithium batteries. Science 311, 977-980 (2006).
Rauh, R. D., et al. A lithium/dissolved sulfur battery with an organic electrolyte. J. Electrochem. Soc. 126, 523-527 (1979).
Shim, J., Striebel, K. A. & Cairns, E. J. The lithium/sulfur rechargeable cell. J. Electrochem. Soc. 149, A1321-A1325 (2002).
Peramunage, D. & Licht, S. A solid sulfur cathode for aqueous batteries. Science 261, 1029-1032 (1993).
Cunningham, P. T., Johnson, S. A. & Cairns, E. J. Phase equilibria in lithium-chalcogen systems: Lithium—sulfur. J. Electrochem. Soc. 119, 1448-1450 (1972).
Choi, J.-W. et al. Rechargeable lithium/sulfur battery with suitable mixed liquid electrolytes. Electrochim. Acta 52, 2075-2082 (2007).
Rauh, R. D., Shuker, F. S., Marston, J. M. & Brummer, S. B. Formation of lithium polysulfides in aprotic media. J. Inorg. Nucl. Chem. 39, 1761-1766 (1977).
Cheon, S.-E. et al. Rechargeable lithium sulfur battery II. Rate capability and cycle characteristics. J. Electrochem. Soc. 150, A800-A805 (2003).
Shin, J. H. J. Electrochem. Soc. 155, A368-A373 (2008).
Yuan, L. X. et al. Improved dischargeability and reversibility of sulfur cathode in a novel ionic liquid electrolyte. Electrochem. Commun. 8, 610-614 (2006).
Ryu, H.-S. et al. Discharge behavior of lithium/sulfur cell with TEGDME based electrolyte at low temperature. J. Power Sources 163, 201-206 (2006).
Wang, J. et al. Sulfur-mesoporous carbon composites in conjunction with a novel ionic liquid electrolyte for lithium rechargeable batteries. Carbon 46, 229-235 (2008).
Chung, K.-I., et al. Lithium phosphorous oxynitride as a passive layer for anodes in lithium secondary batteries. J. Electroanal. Chem. 566 263-267 (2004).
Akridge, J. R., Mikhaylik, Y. V. & White, N. Li/S fundamental chemistry and application to high-performance rechargeable batteries. Solid State Ion. 175, 243-245 (2004).
Mikhaylik, Y. V. & Akridge, J. R. Low temperature performance of Li/S batteries. J. Electrochem. Soc. 150, A306-A311 (2003).
Zhen, W. Novel nanosized adsorbing sulfur composite cathode materials for the advanced secondary lithium batteries. Electrochim. Acta 51, 1330-1335 (2006).
Cheon, S.-E. et al. Capacity fading mechanisms on cycling a high-capacity secondary sulfur cathode. J. Electrochem. Soc. 151, A2067-A2073 (2004).
Song, M.-S. et al. Effects of nanosized adsorbing material on electrochemical properties of sulfur cathode for Li/S secondary batteries. J. Electrochem. Soc. 151, A791 (2004).
Kobayashi, T. et al. All solid-state battery with sulfur electrode and thio-LISICON electrolyte. J. Power Sources 182, 621 (2008).
Wang, J., Yang, J., Xie, J. & Xu, N. A novel conductive polymer-sulfur composite cathode material for rechargeable lithium batteries. Adv. Mater. 14, 963-965 (2002).
Xiulei Ji, Kyu Tae Lee, & Linda F. Nazar, "A highly ordered nanostructured carbon—sulphur cathode for lithium—sulphur batteries," Nature Materials 8, 500-506 (2009).

* cited by examiner

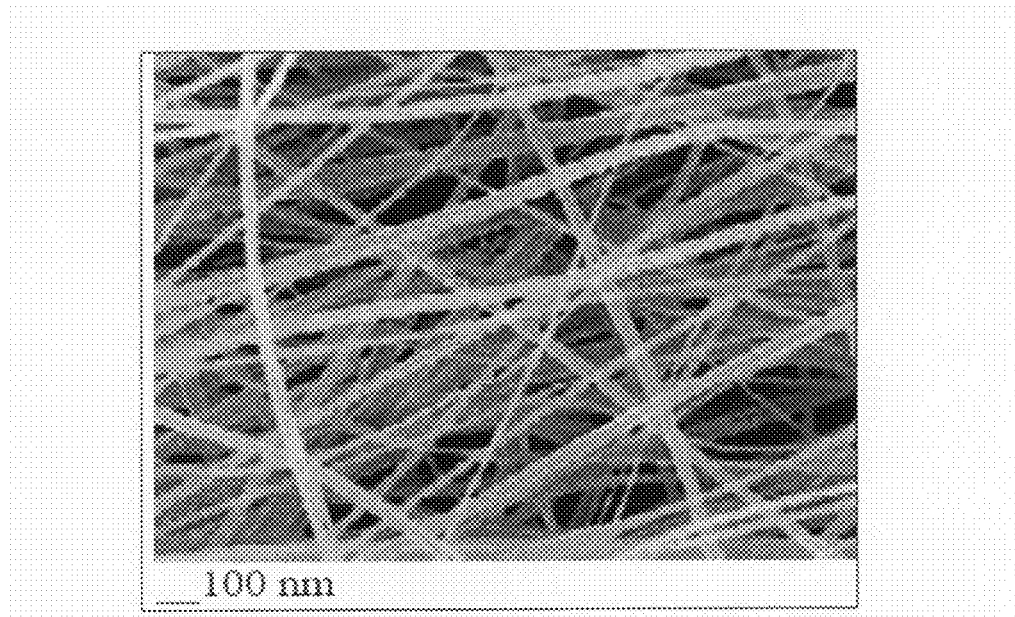
FIG. 1(A)
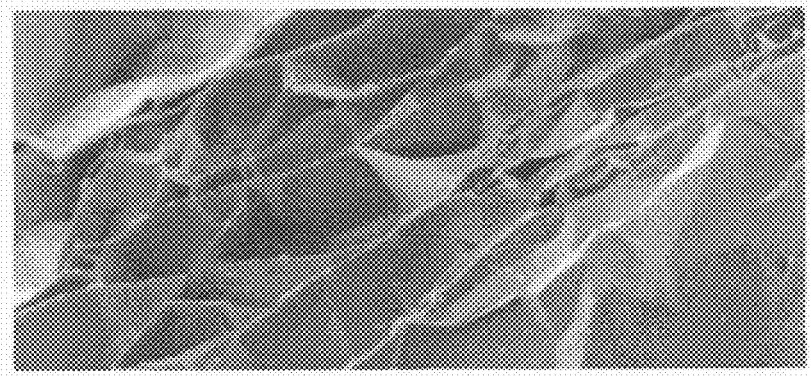
FIG. 1(B)  10 nm

LITHIUM METAL-SULFUR AND LITHIUM ION-SULFUR SECONDARY BATTERIES CONTAINING A NANO-STRUCTURED CATHODE AND PROCESSES FOR PRODUCING SAME

FIELD OF THE INVENTION

The present invention provides a nano-structured material composition for use as a cathode material in a secondary or rechargeable lithium metal battery or lithium-ion battery.

BACKGROUND

The description of prior art will be primarily based on the references listed below:
List of References:
1. Aruna Zhamu and Bor Z. Jang, "Hybrid Nano Filament Anode Compositions for Lithium Ion Batteries," U.S. patent application Ser. No. 12/006,209 (Jan. 2, 2008).
2. Aruna Zhamu and Bor Z. Jang, "Hybrid Nano Filament Cathode Compositions for Lithium Ion and Lithium Metal Batteries," U.S. patent application Ser. No. 12/009,259 (Jan. 18, 2008).
3. Kang, K., Meng, Y. S., Breger, J., Grey, C. P. & Ceder, G. Electrodes with high power and high capacity for rechargeable lithium batteries. *Science* 311, 977-980 (2006).
4. Rauh, R. D., Abraham, K. M., Pearson, G. F., Surprenant, J. K. & Brummer, S. B. A lithium/dissolved sulfur battery with an organic electrolyte. *J. Electrochem. Soc.* 126, 523-527 (1979).
5. Shim, J., Striebel, K. A. & Cairns, E. J. The lithium/sulfur rechargeable cell. *J. Electrochem. Soc.* 149, A1321-A1325 (2002).
6. Chu, M.-Y. Rechargeable positive electrodes. U.S. Pat. No. 5,686,201 (1997).
7. Peramunage, D. & Licht, S. A solid sulfur cathode for aqueous batteries. *Science* 261, 1029-1032 (1993).
8. Cunningham, P. T., Johnson, S. A. & Cairns, E. J. Phase equilibria in lithium—chalcogen systems: Lithium—sulfur. *J. Electrochem. Soc.* 119, 1448-1450 (1972).
9. Choi, J.-W. et al. Rechargeable lithium/sulfur battery with suitable mixed liquid electrolytes. *Electrochim. Acta* 52, 2075-2082 (2007).
10. Rauh, R. D., Shuker, F. S., Marston, J. M. & Brummer, S. B. Formation of lithium polysulfides in aprotic media. *J. Inorg. Nucl. Chem.* 39, 1761-1766 (1977).
11. Cheon, S.-E. et al. Rechargeable lithium sulfur battery II. Rate capability and cycle characteristics. *J. Electrochem. Soc.* 150, A800-A805 (2003).
12. Shin, J. H. & Cairns, E. J. Characterization of N-methyl-N-butylpyrrolidinium bis(trifluoro-methanesulfonyl) imide-LiTFSI-tetra(ethylene glycol) dimethyl ether mixtures as a Li metal cell electrolyte. *J. Electrochem. Soc.* 155, A368-A373 (2008).
13. Yuan, L. X. et al. Improved dischargeability and reversibility of sulfur cathode in a novel ionic liquid electrolyte. *Electrochem. Commun.* 8, 610-614 (2006).
14. Ryu, H.-S. et al. Discharge behavior of lithium/sulfur cell with TEGDME based electrolyte at low temperature. *J. Power Sources* 163, 201-206 (2006).
15. Wang, J. et al. Sulfur-mesoporous carbon composites in conjunction with a novel ionic liquid electrolyte for lithium rechargeable batteries. *Carbon* 46, 229-235 (2008).
16. Chung, K.-I., Kim, W.-S. & Choi, Y.-K. Lithium phosphorous oxynitride as a passive layer for anodes in lithium secondary batteries. *J. Electroanal. Chem.* 566, 263-267 (2004).
17. Visco, S. J., Nimon, Y. S. & Katz, B. D. Ionically conductive composites for protection of active metal anodes. U.S. Pat. No. 7,282,296, October 16 (2007).
18. Skotheim, T. A., Sheehan, C. J., Mikhaylik, Y. V. & Affinito, J. Lithium anodes for electrochemical cells. U.S. Pat. No. 7,247,408, July 24 (2007).
19. Akridge, J. R., Mikhaylik, Y. V. & White, N. Li/S fundamental chemistry and application to high-performance rechargeable batteries. *Solid State Ion.* 175, 243-245 (2004).
20. Mikhaylik, Y. V. & Akridge, J. R. Low temperature performance of Li/S batteries. *J. Electrochem. Soc.* 150, A306-A311 (2003).
21. Zheng, W., Liu, Y. W., Hu, X. G. & Zhang, C. F. Novel nanosized adsorbing sulfur composite cathode materials for the advanced secondary lithium batteries. *Electrochim. Acta* 51, 1330-1335 (2006).
22. Cheon, S.-E. et al. Capacity fading mechanisms on cycling a high-capacity secondary sulfur cathode. *J. Electrochem. Soc.* 151, A2067-A2073 (2004).
23. Song, M.-S. et al. Effects of nanosized adsorbing material on electrochemical properties of sulfur cathode for Li/S secondary batteries. *J. Electrochem. Soc.* 151, A791-A795 (2004).
24. Kobayashi, T. et al. All solid-state battery with sulfur electrode and thio-LISICON electrolyte. *J. Power Sources* 182, 621 (2008).
25. Wang, J., Yang, J., Xie, J. & Xu, N. A novel conductive polymer-sulfur composite cathode material for rechargeable lithium batteries. *Adv. Mater.* 14, 963-965 (2002).
26. Xiulei Ji, Kyu Tae Lee, & Linda F. Nazar, "A highly ordered nanostructured carbon—sulphur cathode for lithium—sulphur batteries," *Nature Materials* 8, 500-506 (2009).
27. D. J. Burton, et al, "Method of Depositing Silicon on Carbon Materials and Forming an Anode for Use in Lithium Ion Batteries," US Pub No. 2008/0261116 (Oct. 23, 2008).
28. D. W. Firsich, "Silicon-Modified Nanofiber Paper As an Anode Material for a Lithium Ion Battery," US Patent Publication 2009/0068553 (Mar. 23, 2009).

Lithium Metal Secondary Batteries:

Lithium-ion (Li-ion), lithium metal, and Li metal-air batteries are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density and power density than lithium ion batteries.

Historically, rechargeable lithium metal batteries were produced using non-lithiated compounds having high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon cycling, the lithium metal resulted in the formation of dendrites at the anode that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. Specific cycling stability and safety issues of lithium metal rechargeable batteries are primarily related to the high tendency for Li to form dendrite structures during repeated charge-discharge cycles or an overcharge, leading to internal electrical shorting and thermal runaway.

Many attempts have been made to address the dendrite-related issues. However, despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. An urgent need exists for a simpler, more cost-effective, and easier to implement approach to preventing Li metal dendrite-induced internal short circuit and thermal runaway problems in Li metal batteries and other rechargeable batteries.

Lithium Ion Secondary Batteries:

Parallel to these efforts and prompted by the aforementioned concerns over the safety of earlier lithium metal secondary batteries led to the development of lithium ion secondary batteries, in which pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized.

The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g. In other graphitized carbon materials than pure graphite crystals, there exists a certain amount of graphite crystallites dispersed in or bonded by an amorphous or disordered carbon matrix phase. The amorphous phase typically can store lithium to a specific capacity level higher than 372 mAh/g, up to 700 mAh/g in some cases, although a specific capacity higher than 1,000 mAh/g has been sporadically reported. Hence, the magnitude of x in a carbonaceous material $Li_xC_6$ varies with the proportion of graphite crystallites and can be manipulated by using different processing conditions. An amorphous carbon phase alone tends to exhibit a low electrical conductivity (high charge transfer resistance) and, hence, a high polarization or internal power loss. Conventional amorphous carbon-based anode materials also tend to give rise to a high irreversible capacity.

In addition to carbon- or graphite-based anode materials, other inorganic materials that have been evaluated for potential lithium ion anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies $0<a\le5$ when the battery is fully charged) has been investigated as potential anode materials. This class of anode material has a higher theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, for the anodes composed of these materials, pulverization (fragmentation of the alloy particles) proceeds with the progress of the charging and discharging cycles due to expansion and contraction of the anode during the absorption and desorption of the lithium ions. The expansion and contraction also tend to result in reduction in or loss of particle-to-particle contacts or contacts between the anode and its current collector. These adverse effects result in a significantly shortened charge-discharge cycle life.

To overcome the problems associated with such mechanical degradation, composites composed of small, electrochemically active particles supported by less active or non-active matrices have been proposed for use as an anode material. Examples of these active particles are Si, Sn, and $SnO_2$. However, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

Highest Specific Capacity Anode and Cathode Materials

Lithium-ion (Li-ion) batteries are promising energy storage devices for electric drive vehicles. However, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. Further, the current Li-sulfur products of Sion Power Co. and Polyplus Fuels Co., the two industry leaders in sulfur cathode technology, have a maximum specific energy of 400 Wh/kg.

With the rapid development of hybrid (HEV) and plug-in hybrid electric vehicles (HEV), there is an urgent need for anode and cathode materials that provide a rechargeable battery with a significantly higher specific energy, higher energy density, higher rate capability, long cycle life, and safety. One of the most promising energy storage devices is the lithium—sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode [Ref. 4,5]. The lithium—sulfur cell operates with a redox couple, described by the reaction $S_8+16Li \leftrightarrow 8Li_2S$ that lies near 2.2 V with respect to $Li^+/Li°$. This electrochemical potential is approximately ⅔ of that exhibited by conventional positive electrodes. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Values can approach 2,500 Wh/kg or 2,800 Wh/l on a weight or volume basis, respectively, assuming complete reaction to $Li_2S$ [Ref 6,7]. However, the current Li-sulfur products of Sion Power Co. and Polyplus Fuels Co., the two industry leaders in sulfur cathode technology, have a maximum specific energy of 400 Wh/kg.

In summary, despite its considerable advantages, the Li—S cell has been plagued with several problems that have hindered its widespread commercialization:

(1) Conventional lithium metal cells still have dendrite formation and related internal shorting issues;
(2) Sulfur or sulfur-containing organic compounds are highly insulating, both electrically and ionically. To enable a reversible electrochemical reaction at high current rates, the sulfur must maintain intimate contact with an electrically conductive additive. Various carbon—sulfur composites have been used for this purpose, but only with limited success owing to the scale of the contact area. Typical reported capacities are between 300 and 550 mAh/g at moderate rates [Ref 8].
(3) To make a sulfur-containing cathode ionically conductive, liquid electrolytes are used to serve not only as a charge transport medium but also as ionic conductors within the sulfur-containing cathode [Ref 9]. This presents difficulties of electrolyte access.
(4) The cell tends to exhibit significant capacity degradation on repeated discharge—charge cycling. This is mainly due to the high solubility of the polysulfide anions formed as reaction intermediates during both discharge and charge processes in the polar organic solvents used in electrolytes [Ref. 10]. During cycling, the polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss [Ref. 11]. To put it in a broader context, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes [Ref. 12-15] and protective films [Ref. 16-18] for the lithium anode have been developed. Combinations of electrolyte modification, additives and anode protection have resulted in some promising results [Ref. 19]. However, much of the difficulty still remains at the cathode. For instance, in some cell configurations, all of the sulfides are allowed to be solubilized (so-called 'catholyte' cells) [Ref. 20]. In the opposite approach (i.e. to contain the sulfides), some interesting cathode developments have been reported recently [Ref. 21-24]; but, their performance still fall short of what is required for practical applications.

These studies include, for example, the fabrication of disordered mesoporous carbon/sulfur composites in conjunction with ionic liquid electrolytes; systems that achieve high initial capacity, but suffer extensive capacity fading [Ref. 24]. Composites with sulfur embedded in conducting polymers have shown some promising results [Ref. 25]. However, a large polarization was observed, resulting in a very low operating voltage that reduces the energy density of cells. The loading of active mass in the S-polymer composite is also limited (less than 55 wt %) owing to the low surface area of the conducting polymer.

Using a composite structure approach, Oyama et al., in U.S. Pat. No. 5,324,599, discloses composite cathodes containing disulfide organo-sulfur or polyorgano-disulfide materials, as disclosed by Dejonghe, et al. in U.S. Pat. No. 4,833,048, by a combination with or a chemical derivative with a conductive polymer. The conductive polymers are described as capable of having a porous structure that holds disulfide compounds in their pores.

In a similar approach to overcoming the dissolution problem with polyorgano-disulfide materials by a combination or a chemical derivative with a conductive, electroactive material, U.S. Pat. No. 5,516,598 to Visco et al. discloses composite cathodes comprising metal-organosulfur charge transfer materials with one or more metal-sulfur bonds, wherein the oxidation state of the metal is changed in charging and discharging the positive electrode or cathode. The metal ion provides high electrical conductivity to the material, although it significantly lowers the cathode energy density and capacity per unit weight of the polyorgano-disulfide material. This reduced energy density is a disadvantage of derivatives of organo-sulfur materials when utilized to overcome the dissolution problem. The polyorganosulfide material is incorporated in the cathode as a metallic-organosulfur derivative material, similar to the conductive polymer-organosulfur derivative of U.S. Pat. No. 5,324,599, and presumably the residual chemical bonding of the metal to sulfur within the polymeric material prevents the formation of highly soluble sulfide or thiolate anion species.

Most recently, Ji, et al [Ref. 26] reported that cathodes based on nanostructured sulfur/mesoporous carbon materials could overcome these challenges to a large degree, and exhibit stable, high, reversible capacities (up to 1,320 mAh per gram of the cathode material) with good rate properties and cycling efficiency. However, the fabrication of the proposed highly ordered mesoporous carbon structure requires a tedious and expensive template-assisted process.

Despite the various approaches proposed for the fabrication of high energy density rechargeable cells containing elemental sulfur, organo-sulfur and carbon-sulfur cathode materials, or derivatives and combinations thereof, there remains a need for materials and cell designs that retard the out-diffusion of anionic reduction products, from the cathode compartments into other components in these cells, improve the utilization of electroactive cathode materials and the cell efficiencies, and provide rechargeable cells with high capacities over a large number of cycles.

Most significantly, lithium metal (including pure lithium, alloys of lithium with other metal elements, or lithium-containing compounds) still provides the highest anode specific capacity as compared to essentially all anode active materials (except pure silicon, but silicon has pulverization issues discussed above). Lithium metal would be an ideal anode material in a lithium metal or lithium-air secondary battery if dendrite related issues could be addressed. In addition, there are several non-lithium anode active materials that exhibit high specific lithium-storing capacities (e.g., Si, Sn, and Ge as an anode active material) in a lithium ion battery wherein lithium is inserted into the lattice sites of Si, Sn, or Ge in a charged state.

Hence, an object of the present invention was to provide a rechargeable Li-metal or Li-ion battery that exhibits an exceptionally high specific energy or energy density. One particular technical goal of the present invention was to provide a Li metal-sulfur or Li ion-sulfur cell with a specific energy greater than 400 Wh/Kg, or even greater than 600 Wh/Kg.

A specific object of the present invention was to provide a Li metal or lithium-ion secondary cell wherein the cathode initially comprises an integrated structure of conductive nano-filaments with lithium sulfides ($Li_xS_8$, partially or fully oxidized state of sulfur) dispersed in spaces (pores) between nano-filaments and wherein lithium sulfides are in fine powder form or a thin coating bonded to or coated on nano-filament surfaces. During the first charge operation, lithium sulfides are reduced to sulfur. During subsequent charge and discharge operations, lithium sulfides are essentially retained in the pores constituted by the nano-filaments, permitting only $Li^+$ ions to diffuse back and forth between the anode and the cathode.

Another object of the present invention was to provide a simple (not too complex), cost-effective, and easier-to-implement approach to preventing potential Li metal dendrite-induced internal short circuit and thermal runaway problems in Li metal-sulfur batteries featuring the aforementioned nano-structured cathode.

Another object of the present invention was to provide a nano-structured composition for use as an anode substrate of a Li metal-sulfur cell that is resistant to dendrite formation and exhibits a long and stable cycling response. This nano-structured anode is assembled together with a nano-structured cathode.

Still another object of the present invention was to provide a lithium metal cell or Li-ion that exhibits a high specific capacity, high specific energy, good resistance to dendrite formation, and a long and stable cycle life.

Yet another object of the present invention was to provide a lithium-ion cell wherein the anode comprises a nano-structured composition (integrated structure of conductive nano-filaments and high-capacity anode active material such as Si particles, nano-wires, or thin coating) and the cathode comprises an integrated structure of conductive nano-filaments. The integrated structure, being highly conductive, can also function as a current collector, obviating the need to have a separate current collector at either the anode or the cathode side. Such a configuration can significantly reduce the overhead weights of a cell, thereby affording an ultra-high specific capacity and specific energy.

SUMMARY OF THE INVENTION

The present invention provides an electrochemical cell comprising an anode, a separator, electrolyte, and a nano-structured cathode, wherein the cathode comprises:
(a) an integrated structure of electrically conductive nanometer-scaled filaments that are interconnected to form a porous network of electron-conducting paths comprising pores with a size smaller than 100 nm (preferably smaller than 10 nm), wherein the filaments have a transverse dimension less than 500 nm (preferably less than 100 nm); and
(b) powder or salt of lithium-containing sulfide (or lithium polysulfide) disposed in the pores or a thin coating of lithium-containing sulfide deposited on a nano-scaled filament surface wherein the lithium-containing sulfide is in contact with, dispersed, or dissolved in an liquid electrolyte and the lithium-containing sulfide-to-filament weight ratio is between 1/10 and 10/1 which is measured when the cell is in a fully discharged state.

When the cathode is made, lithium-containing sulfide or lithium polysulfide (not just elemental sulfur, or in addition to elemental sulfur) is embedded in the nano-scaled pores constituted by the nano-filaments. The lithium-containing sulfide, comprising $Li_2S_x$ (where x=1-8), may preferably be in an ultra-fine powder form mixed with a solid electrolyte powder or as a lithium polysulfide salt dissolved or dispersed in a liquid electrolyte. The lithium-containing sulfide may also be in a thin-film coating form deposited on a surface of the nano-filaments. This lithium polysulfide coating is then brought in contact with an electrolyte. This implies that the resulting cell is in a partially or fully discharged state when the cell is made. Preferably, the lithium content of this cathode is sufficient to provide the necessary amount of the Li ions that shuttle back and forth between the anode and the cathode during subsequent charge and discharge operations. This provision makes it possible for the anode side of the cell to be essentially free from lithium metal to begin with (when the cell is made). Although a small amount of lithium may be incorporated in the anode when a cell is made, it is more desirable to have most or all of the lithium content being contained in the lithium-containing sulfide of the cathode or lithium-containing electrolyte when the cell is manufactured. This is because lithium polysulfide is much more stable against open air (containing oxygen or moisture) as compared to lithium metal, and, hence, more conducive to cell production in an industrial manufacturing environment.

Preferably, multiple conductive nano-filaments are processed to form an integrated aggregate structure, preferably in the form of a web, mat, or paper, characterized in that these filaments are intersected, overlapped, or somehow bonded (e.g., using a binder material) to one another to form a network of electron-conducting paths. The integrated structure has substantially interconnected pores that are intended for accommodating and retaining the cathode active material (lithium-containing sulfide) and electrolyte in the cathode, allowing only lithium ions to diffuse in and out of the pores. To achieve such a critically important function, the pores have a size smaller than 100 nm, but preferably smaller than 10 nm and more preferably smaller than 5 nm. It is of significance to herein emphasize that the nano-pores of the presently invented cathode structures were not made by using a template-assisted procedure, which otherwise would be tedious and expensive.

It may be noted that, as discussed earlier, Ji, et al [Ref. 26] reported a cathode based on nanostructured sulfur/mesoporous carbon materials that could exhibit stable and high reversible capacities (up to 1,320 mAh per gram of the cathode material) with good rate properties and cycling efficiency. However, the fabrication of the proposed highly ordered mesoporous carbon structure requires a tedious and expensive process that involves the utilization of a sacrificial template. Further, the cathode was made to contain elemental sulfur and, hence, required a lithium metal foil at the anode when the cell was made. Similarly, Zheng et al [Ref.21] used carbon nanotubes (CNTs) to form meso pores (10-60 nm), but also began with absorbing elemental sulfur in the pores when the cell was made, requiring the use of a lithium metal foil at the anode. The Li metal foil presents a challenging operation in a real world manufacturing environment. Neither Li, et al. nor Zhen, et al. recognized that non-CNT nano-filaments could be utilized to form nano-pores capable of retaining lithium polysulfide species comprising $Li_2S_x$, where x=1-8 inclusive, allowing only $Li^+$ to be shuttled back and forth between the cathode and the anode and preventing any intermediate $Li_2S_x$ from migrating to the anode. We were most surprising to observe that this nano-structured cathode approach effectively reduced or eliminated the capacity loss of the sulfur cathode during repeated charging and discharging cycles.

The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 µm and 10 µm, but could be longer or shorter. The NGPs, just like other elongate bodies (carbon nano tubes, carbon nano fibers, metal nano wires, etc.), readily overlap one another to form a myriad of electron transport paths for improving the electrical conductivity of the anode. In the present application, NGPs preferably have a thickness less than 10 nm, more preferably <1 nm, and most preferably comprise single-layer graphene.

The nano-filaments may comprise a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof.

The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10 (typically much higher than 100). In the case of an NGP, the platelet has a length, a width, and a thickness, wherein the length-to-width ratio is preferably at least 3.

Another preferred embodiment of the present invention is a lithium metal-sulfur cell featuring a nano-structured cathode as described above and further featuring a nano-structured anode configuration capable of permitting lithium metal to uniformly deposit thereon when the cell is re-charged. This nano-structured anode comprises an integrated structure of electrically conductive nanometer-scaled filaments that are interconnected to form a porous network of electron-conducting paths comprising interconnected pores, wherein the filaments have a transverse dimension less than 500 nm (preferably <100 nm) and wherein the nano-structured anode provides a sufficient amount of nano-filament surface areas to support lithium metal when the cell is in a charged state. In the anode structure of the instant invention, upon re-charging, essentially all the returning lithium ions are deposited onto the surface of the nano-filaments to form a nano-scaled coating. The applicants were most surprised to observe no dendrite formation in the anodes of the instant lithium metal batteries after a large number of discharge-charge cycles.

Still another preferred embodiment of the present invention is a lithium ion-sulfur cell containing a nano-structured cathode as described above and also a nano-structured anode, comprising (a) an integrated structure of electrically conductive nanometer-scaled filaments that are interconnected to form a porous network of electron-conducting paths comprising interconnected pores, wherein the filaments have a transverse dimension less than 500 nm (preferably less than 10 nm); and (b) an anode active material bonded to or in physical contact with the integrated structure.

This nano-structured anode could be similar to those proposed by Burton et al [Ref.27] and Firsich [Ref.28] who used vapor-grown carbon nano-fibers (VG-CNFs) to support silicon coating obtained via chemical vapor deposition (CVD). In this case, the CVD silicon is an anode active material. Alternatively and more preferably, the anode structure may be a 3-D integrated structure (based on electro-spun conductive fibers, NGPs, CNTs, nano-wires, etc) for supporting Si nano particles or nano-coating as an anode active material, as disclosed in one of our earlier applications [e.g., Ref. 1]. The returning lithium ions in these earlier applications [Refs.1, 27, 28] were mostly inserted into the Si coating layer or particles. Although Si insertion causes volume swelling of Si coating or particles, nano-filaments enable stress-free volume expansion in the transverse direction, thereby avoiding the Si pulverization problem.

The electrolyte may be selected from the group consisting of polymer electrolyte, polymer gel electrolyte, solid-state electrolyte, composite electrolyte, soft matter phase electrolyte, and combinations thereof. In one preferred embodiment, a separator is used to support electrolyte and the separator is disposed between an anode and a cathode to prevent the anode from contacting the cathode. At least a portion of the electrolyte is hosted by a separator. The separator typically is porous having pores therein to host at least a portion of the electrolyte.

Another preferred embodiment of the present invention is a lithium metal or lithium-ion battery featuring a nano-structured cathode as described above, but the cell is at a discharged state when the cell is made. When the cell is in a charged state, the cathode may comprise sulfur, sulfur-containing molecule, sulfur-containing compound, sulfur-carbon polymer, or a combination thereof.

The presently invented cell provides a reversible specific capacity of typically no less than 400 mAh per gram of the total cell weight including anode, cathode, electrolyte, and separator weights together. The reversible specific capacity is more typically no less than 600 mAh per gram of the total cell weight including anode, cathode, electrolyte, and separator weights together. The cell provides a specific energy of no less than 400 Wh/Kg (more typically no less than 600 Wh/Kg and often greater than 800 Wh/Kg) based on the total cell weight including anode, cathode, electrolyte, and separator weights combined.

The presently invented nano-structured material technology has several major advantages, summarized as follows:
  (1) The lithium-containing sulfide, optionally along with an electrolyte, can be mixed with the nano-filaments to form a 3-D integrated cathode structure in a real battery manufacturing environment since lithium polysulfide is more stable with respect to air and air-born moisture as compared to lithium metal. This would obviate the need to handle lithium metal-based anode when the cell is manufactured.
  (2) During the first charging operation of a lithium metal cell or lithium-ion cell, lithium ions are released from the lithium sulfide at the cathode and transported through electrolyte (and a separator, if existing) to reach the anode. The nano pores are capable of retaining sulfur and lithium polysulfide in the pores, only allowing lithium ions to move out of the pores.

(3) The interconnected network of filaments forms a continuous path for electrons, resulting in significantly reduced internal energy loss or internal heating. The nano-pores also imply the lithium-containing sulfide component inside the pores being nanometer-sized, enabling a fast cathode reaction. Hence, the cell is capable of being re-charged at a high rate. This is a highly beneficial feature for a battery that is intended for high power density applications such as electric vehicles.

(4) The same type of integrated structure of conductive nano-filaments can be used as a support for the anode active material (e.g. Si in a lithium-ion battery or lithium metal in a Li metal cell), significantly simplifying the battery fabrication operations.

(5) During the first charging operation of a Li-metal cell featuring a nano-structured cathode and a nano-structured anode, lithium ions move from the cathode to the anode and deposit onto the surface of nano-filaments to form a lithium metal coating. The nano-filaments selected in the present invention are chemically and thermo-mechanically compatible with lithium, to the extent that the lithium metal coating maintains a good contact with its underlying substrate filament during repeated charge/discharge cycles.

(6) Surprisingly, as an added feature, the nano-structure at the anode provides an environment that is conducive to uniform deposition of lithium atoms, to the extent that no geometrically sharp structures or dendrites were found in the anode after a large number of cycles. Not wishing to be limited by any theory, but the applicants envision that the 3-D network of highly conductive filaments provide substantially uniform electric fields and, hence, uniform attraction of lithium ions back onto the filament surfaces during re-charging.

(7) The nano-structured anode with thin, nano-scaled lithium coating is capable of quickly releasing lithium and thus capable of being discharged at a high rate.

(8) The presently invented cell provides a specific energy typically greater than 400 Wh/Kg (more typically greater than 600 Wh/Kg, often greater than 800 Wh/Kg, and even achieving an unprecedented 2,000 Wh/Kg) based on the total cell weight including anode, cathode, electrolyte, and separator weights combined. This has not been achieved by any prior art approaches These and other advantages and features of the present invention will become more transparent with the description of the following best mode practice and illustrative examples.

It may be further noted that the presently invented nano-structured cathode is not limited to the cases where the starting cathode active material (when the cell is made) is lithium polysulfide. The cathode active material can be sulfur, sulfur-containing molecule, sulfur-containing compound, or sulfur-carbon polymer disposed in pores constituted by all kinds of nano-filaments as described above, but excluding carbon nanotubes (CNTs).

Hence, another preferred embodiment of the present invention is a lithium metal-sulfur or lithium ion-sulfur cell comprising an anode, a separator and/or electrolyte, and a nano-structured cathode, wherein the cathode comprises: (a) an integrated structure of electrically conductive, non-CNT-based, nanometer-scaled filaments that are interconnected to form a porous network of electron-conducting paths comprising pores with a size smaller than 100 nm (preferably smaller than 10 nm and more preferably smaller than 5 nm), wherein the filaments have a transverse dimension less than 500 nm (preferably smaller than 100 nm); and (b) a cathode active material comprising sulfur, sulfur-containing molecule, sulfur-containing compound, or sulfur-carbon polymer disposed in the pores wherein the cathode active material is in contact with said electrolyte, and the cathode active material-to-filament weight ratio is between 1/10 and 10/1 which is measured when said cell is in a fully discharged state.

Again, the filaments may comprise an electrically conductive material selected from the group consisting of electro-spun nano fibers, vapor-grown carbon or graphite nano fibers, carbon or graphite whiskers, carbon nanowires, nano graphene platelets, metal nano wires, and combinations thereof. The filaments may comprise a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. The nano-filaments are bonded by a binder material selected from a resin, a conductive polymer, coal tar pitch, petroleum pitch, mesophase pitch, coke, or a derivative thereof.

The filaments may comprise nano graphene platelets with a thickness less than 10 nm. The filaments may comprise a nano graphene platelet containing nano-scale carbon nodules or bumps adhered to a surface of the graphene platelet. The carbon nodules or bumps serve as a spacer between individual graphene platelets to prevent NGPs from re-stacking or overlapping one another.

BRIEF DESCRIPTION OF THE DRAWINGS

FIG. 1 (A) SEM image of an electro-spun nano-fiber based nano-structure; (B) A nano graphene based nano-structure, prior to the addition of lithium polysulfide in nano pores.

DETAILED DESCRIPTION OF PREFERRED EMBODIMENTS

Figure 2A:
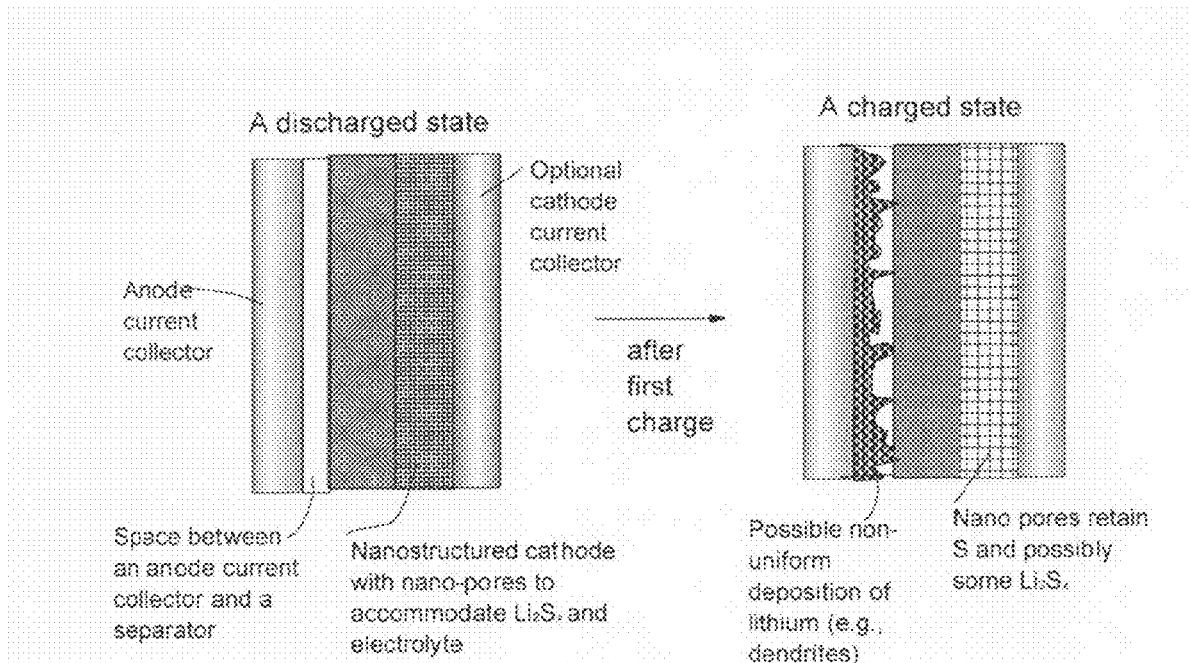
FIG. 2 Battery cells featuring the presently invented nano-structured cathodes: (A) Schematic of a lithium metal-sulfur cell with a conventional anode structure; (B) a lithium metal-sulfur cell with a nano-structured anode; (C) a lithium-ion cell with a conventional anode material; and (D) a lithium-ion cell with a nano-structured anode featuring high-capacity anode active material such as Si, in a thin coating or nano particle form.

This invention is related to a specially designed cathode structure for use in a high-capacity lithium metal-sulfur or lithium ion-sulfur secondary batteries, which are preferably secondary batteries based on a non-aqueous electrolyte, a polymer gel electrolyte, a soft matter phase electrolyte, a solid-state electrolyte, or a composite electrolyte. The shape of a lithium secondary battery can be cylindrical, square, button-like, etc. The present invention is not limited to any battery shape or configuration.

The present invention provides an electrochemical cell comprising an anode, electrolyte (or an electrolyte-separator combination), and a nano-structured cathode. In particular, this cell is a rechargeable lithium metal cell or lithium-ion cell. In one preferred embodiment, the cathode comprises:
(a) an integrated structure of electrically conductive nanometer-scaled filaments that are interconnected to form a porous network of electron-conducting paths comprising pores with a size smaller than 100 nm (preferably smaller than 10 nm and more preferably smaller than 5 nm), wherein the filaments have a transverse dimension (e.g., diameter or thickness) less than 500 nm (preferably less than 100 nm); and
(b) lithium-containing sulfide disposed in the pores (in a powder form in contact with an electrolyte, salt dissolved or dispersed in a liquid electrolyte, or a thin coating of lithium-containing sulfide deposited on a nano-scaled filament surface) wherein the lithium-containing sulfide-to-filament weight ratio is between 1/10 and 10/1 which is measured when the cell is in a fully discharged state.

When the cathode is made, lithium-containing sulfide or lithium polysulfide is embedded in the nano-scaled pores constituted by the nano-filaments. The lithium-containing sulfide, comprising $Li_2S_x$ (where x=1-8), may preferably be in an ultra-fine powder form mixed with a solid electrolyte powder or as a lithium polysulfide salt dissolved or dispersed in a liquid electrolyte. Preferably, lithium-containing sulfide is grinded into nanometer scale (preferably <10 nm and more preferably <5 nm). The nano-scaled lithium-containing sulfide, optionally mixed with a nano-sized solid electrolyte powder or liquid electrolyte, is then combined with nano-filaments to form a nano-structured cathode. Alternatively, liquid electrolyte may be added into the cathode after the cathode is made, or injected into the cell after the cell is made.

Alternatively, the lithium-containing sulfide may be in a thin-film coating form deposited on a surface of the nano-filaments obtained by a solution deposition method, electro-deposition method, a chemical vapor deposition (CVD) method, physical vapor deposition, sputtering, laser ablation, etc. This lithium polysulfide coating is then brought in contact with an electrolyte before, during, or after the cathode is made, or even after the cell is produced.

The use of lithium polysulfide or a combination of lithium polysulfide and sulfur at the cathode side when the cell is produced implies that the resulting cell is in a partially or fully discharged state when the cell is made. Preferably, the lithium content of this cathode is sufficient to provide the necessary amount of the Li ions that are responsible for shuttling back and forth between the anode and the cathode during subsequent charge and discharge operations. This amount sets the maximum capacity limit of a cell. This provision makes it possible for the anode side of the cell to be essentially free from lithium metal to begin with (when the cell is made). It is desirable to have most or all of the lithium content being contained in the lithium-containing sulfide of the cathode and/or lithium-containing electrolyte when the cell is manufactured. This is because lithium sulfide is much more stable against open air (containing oxygen or moisture) as compared to lithium metal, and, hence, more conducive to cell production in an industrial manufacturing environment.

The present design of a nano-structured cathode with nano-scaled pores was mainly motivated by the notion that a significant drawback with cells containing cathodes comprising elemental sulfur, organosulfur and carbon-sulfur materials is related to the dissolution and excessive out-diffusion of soluble sulfides, polysulfides, organo-sulfides, carbon-sulfides and/or carbon-polysulfides (anionic reduction products) from the cathode into the rest of the cell. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

Hence, preferably, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores that are intended for accommodating and retaining the cathode active material (lithium-containing sulfide) and electrolyte in the cathode, allowing only lithium ions to diffuse in and out of the pores. To achieve such a critically important function, the pores must have a size smaller than 100 nm, but preferably smaller than 10 nm and more preferably smaller than 5 nm. It is of significance to herein emphasize that the nano-pores of the presently invented cathode structures were not made by using a template-assisted procedure, which otherwise would be tedious and expensive.

The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For the purpose of illustrating how the nano-structured cathode can be obtained, FIG. 1(A) shows a nano-structured electrode obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm. Nano-scaled lithium polysulfide powder is then introduced into the pores of this structure. This structure may then be then compressed and rigidized using a binder to obtain pores smaller than 10 nm in a controlled manner. Liquid electrolyte can be introduced before or after this compression procedure is carried out.

An NGP is essentially composed of a sheet of graphene plane or multiple sheets of graphene plane stacked and bonded together through van der Waals forces. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. By definition, the thickness of an NGP is 100 nanometers (nm) or smaller, with a single-sheet NGP being as thin as 0.34 nm. The length and width of a NGP are typically between 0.5 μm and 10 μm, but could be longer or shorter. The NGPs, just like other elongate bodies (carbon nano tubes, carbon nano fibers, metal nano wires, etc.), readily overlap one another to form a myriad of electron transport paths for improving the electrical conductivity of the anode. In the present application, NGPs preferably have a thickness less than 10 nm, more preferably <1 nm, and most preferably comprise single-layer graphene. FIG. 1(B) provides an example of nano-porous structure composed of well-assembled nano graphene sheets.

Figure 2B:
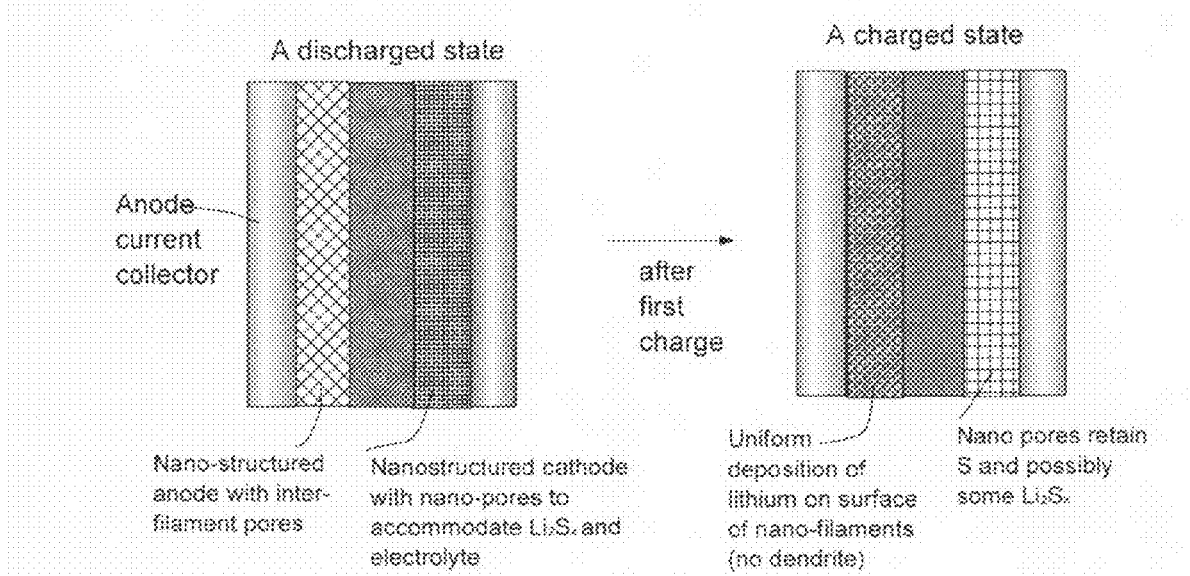
Figure 2C:
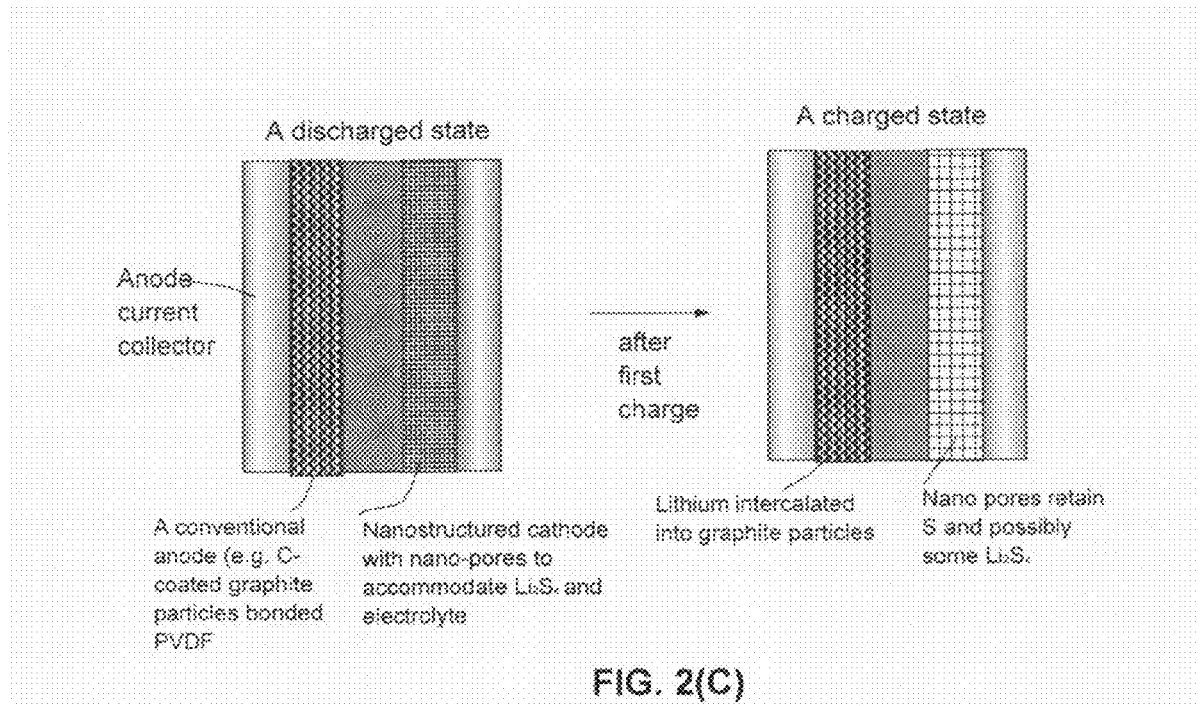
Figure 2D:
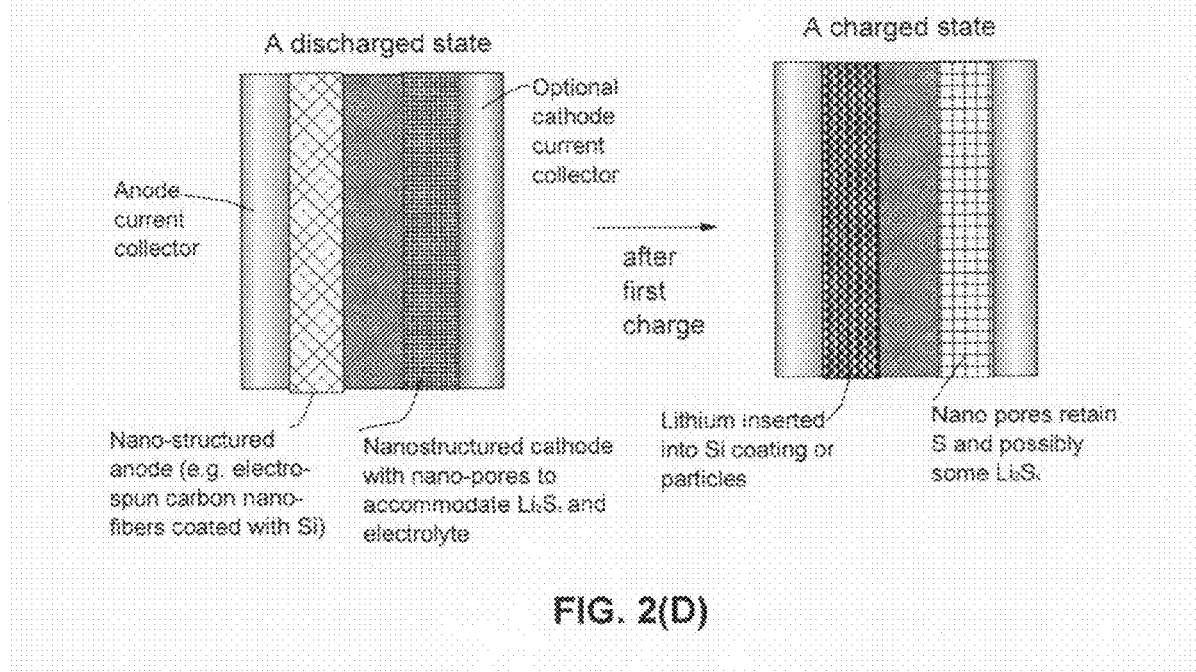

The presently invented nano-structured cathode may be incorporated in one of at least four broad classes of lithium metal or lithium ion cells:

(A) Lithium metal-sulfur with a conventional anode configuration: an anode current collector plus an empty space are used to accommodate lithium metal deposited back to the anode during a charge or re-charge operation, as schematically shown in FIG. 2(A). Potential dendrite formation may be overcome by other prior art approaches, e.g. using a solid electrolyte, a composite separator, or a dendrite-scavenging polymer, etc. Further, we observed that Li metal-sulfur cells have significantly lower tendency to form dendrites as compared with Li metal cells containing other cathodes for the reasons that remain unclear;

(B) Lithium metal-sulfur cell with a nano-structured anode configuration: an anode current collector plus a nano-structure to accommodate lithium metal deposited back to the anode during a charge or re-charge operation, as schematically shown in FIG. 2(B). This nano-structure (web, mat, or paper) of nano-filaments provide a uniform electric field enabling uniform Li metal deposition. This configuration provides a dendrite-free cell for long and safe cycling behavior;

(C) Lithium ion-sulfur cell with a conventional anode: for instance, with an anode composed of anode active graphite particles bonded by a binder, such as polyvinylidene fluoride (PVDF) or styrene-butadiene rubber (SBR), as illustrated in FIG. 2(C); and (D) Lithium ion-sulfur cell with a nano-structured anode: for instance, a web of nano-fibers coated with Si coating or bonded with Si nano particles, as schematically illustrated in FIG. 2(D). This configuration provides an ultra-high capacity and energy density.

As schematically illustrated in FIG. 2(A), a conventional lithium metal cell may be comprised of an anode current collector, an empty anode space, an electrolyte phase (optionally but preferably supported by a separator, hereinafter referred to as the electrolyte-separator layer), a nano-structured cathode of the instant invention, and an optional cathode collector. This cathode current collector is optional because the presently invented nano-structure, if properly designed, can act as a current collector or an extension of a current collector. During the first charge operation, lithium ions are released from the cathode and moved to the anode side. This configuration, although also within the scope of the present invention, is not a particularly preferred choice since it presents several challenging problems to the battery designer. First, there might be a gap or disconnection between the anode current collector and the separator or electrolyte, disrupting the lithium deposition process during re-charging of the battery. Second, there is limited conductive surface to accept depositing lithium ions because the front surface (facing the original lithium foil) of the anode current collector has a "relatively small surface area," limiting the over-all speed of lithium deposition (hence, the battery cannot be re-charged at a high rate). Such a "relatively small surface area" is with respect to the ultra-high surface area provided by the nano-scaled filaments that constitute the 3-D porous structure of FIG. 2(B). Third, the planar geometry of the anode current collector, disposed at a distance from the separator, tends to lead to non-uniform deposition of lithium during re-charging of the battery, resulting in the formation of dendrites. All these challenging problems have been solved by the presently invented, more preferred nano-structured anode composition, FIG. 2(B).

As schematically shown in FIG. 2(B), the nano-structured anode is composed of a 3-D porous structure of highly conductive nano-filaments having spaces or pores between filaments to accommodate the returning Li atoms. During the first charge cycle, lithium ions are released from the lithium sulfide at the cathode and transported through electrolyte (and a separator, if existing) to reach the anode. The geometry, stiffness, and strength of the nano-filaments (e.g., CNF, CNT, metal nano wire, and NGP), preferably bonded by a binder, enables the integrated 3-D structure to maintain its shape and dimension during this charge and subsequent re-charge/discharge cycles.

More significantly, during the first charging operation, lithium ions move from the cathode to the anode and deposit onto the surface of nano-filaments to form a uniform lithium metal coating. Lithium does not form into a foil form or individual/isolated particles. Instead, lithium uniformly deposits onto nano-filament surfaces and forms a thin coating thereon. The nano-filaments selected in the present invention are chemically and thermo-mechanically compatible with lithium, to the extent that the lithium coating maintains a good and uniform contact with its underlying substrate filament during repeated charge/discharge cycles.

Most surprisingly and significantly, the nano-structure provides an environment that is conducive to uniform deposition of lithium atoms, to the extent that no geometrically sharp structures or dendrites were found in the anode after a large number of cycles. Not wishing to be bound by any theory, but the applicants envision that the 3-D network of highly conductive nano-filaments provide a substantially uniform attraction of lithium ions back onto the filament surfaces during re-charging. This is an unexpected result that no prior art worker has ever taught or reported.

Furthermore, due to the nanometer sizes of the filaments, there is a large amount of surface area per unit volume or per unit weight of the nano-filaments. This ultra-high specific surface area offers the lithium ions an opportunity to uniformly deposit a lithium metal coating on filament surfaces at a high rate, enabling high re-charge rates for a lithium metal secondary battery.

To achieve high capacity in electric current producing cells or batteries, it is desirable to have either a higher quantity or loading of cathode active material or, preferably, a higher-capacity cathode active material in the cathode layer. Sulfur and sulfur-based molecules or compounds are particularly desirable cathode active materials for use in practicing the present invention. Lithium and sulfur are highly desirable as the electrochemically active materials for the anode and cathode, respectively, because they provide nearly the highest energy density possible on a weight or volume basis of any of the known combinations of active materials. To obtain high energy densities, the lithium can be present as the pure metal, in an alloy (in a lithium-metal cell), or in an intercalated form (in a lithium-ion cell), and the sulfur can be present as elemental sulfur or as a component in an organic or inorganic material with a high sulfur content, preferably above 50 weight percent sulfur. For example, in combination with a lithium anode (theoretical specific capacity=3,861.7 mAh/g), elemental sulfur has a theoretical specific capacity of 1,675 mAh/g, and carbon-sulfur polymer materials with trisulfide and longer polysulfide groups in the polymer have shown specific capacities of 1,200 mAh/g. These high specific capacities are particularly desirable for applications where low weight and/or low volume of the battery are important, such as portable electronic devices and electric vehicles.

In the present context, the term "carbon-sulfur polymer materials" refers to those carbon-sulfur polymers with carbon-sulfur single bonds and with sulfur-sulfur bonds forming trisulfide (—SSS—) and higher polysulfide linkages. These carbon-sulfur polymer materials comprise, in their oxidized state, a polysulfide moiety of the formula, —$S_m$—, wherein m is an integer equal to or greater than 3. For example, these carbon-sulfur polymer materials are described in U.S. Pat. Nos. 5,601,947 and 5,529,860. Organo-sulfur materials with only disulfide groups typically show specific capacities in the range of 300 to 700 mAh/g and are accordingly less desirable for those applications requiring high specific capacities.

Those skilled in the art of battery design and fabrication realize that practical battery cells comprise, in addition to cathode and anode active materials, other non-electroactive materials, such as a container, current collectors, electrode separators, polymeric binders, conductive additives and other additives in the electrodes, and an electrolyte. The electrolyte is typically an aqueous or non-aqueous liquid, gel, or solid material containing dissolved salts or ionic compounds with good ionic conductance but poor electronic conductivity. All of these additional non-electroactive components are typically required to make the battery perform efficiently, but their use effectively reduces the gravimetric and volumetric energy density of the cell. Therefore, it is desirable to keep the quantities of these non-electroactive materials to a minimum so as to maximize the amount of electrode active material in the battery cell.

For the anode, the presently invented 3-D integrated structure can be made to contain a pore level as low as 5% and as high as 95%, but preferably between 10% and 90%, and more preferably between 50% and 90%. A good proportion of the anode active material (e.g., Si) can be incorporated in the pores of the 3-D integrated structure as an anode. No additional binder is needed.

For a conventional cathode layer containing transition metal oxides as a cathode active material, these oxides typically have some electrically conductive properties and are typically microporous so that high levels of added conductive fillers are not required. With sulfur-based compounds, which have much higher specific capacities than the transition metal oxides, it is difficult to obtain efficient electrochemical utilization of the sulfur-based compounds at high volumetric densities because the sulfur-based compounds are highly insulating and are generally not micro-porous. For example, U.S. Pat. No. 5,532,077 to Chu describes the problems of overcoming the insulating character of elemental sulfur in composite cathodes and the use of a large volume fraction of an electronically conductive material (carbon black) and of an ionically conductive material (e.g., polyethylene oxide or PEO) in the composite electrode to try to overcome these problems. Typically, Chu had to use nearly 50% or more of non-active materials (e.g., carbon black, binder, PEO, etc), effectively limiting the relative amount of active sulfur. Furthermore, presumably one could choose to use carbon paper (instead of or in addition to carbon black) as a host for the cathode active material. However, this conventional carbon fiber paper does not allow a sufficient amount of cathode active material to be coated on the large-diameter carbon fiber surface yet still maintaining a low coating thickness, which is required of a reduced lithium diffusion path length for improved charge/discharge rates and reduced resistance. In other words, in order to have a reasonable proportion of an electrode active material coated on a large-diameter fiber, the coating thickness has to be proportionally higher. A thicker coating would mean a longer diffusion path for lithium to come in and out, thereby slowing down the battery charge/discharge rates. The instant application solved these challenging problems by using an integrated 3-D nano-structure of conductive nano-filaments to host the active sulfur-containing compound or lithium sulfide.

As opposed to carbon paper (often used as a host for elemental sulfur, conductive additives, ion conductors, and electrolyte) that was composed of micron-scaled carbon fibers (typically having a diameter of >12 µm), the instant application makes use of mats or webs of nano-scaled filaments with a diameter less than 500 nm, preferably less than 100 nm. The diameters of these fibers or filaments are a critically important factor that had been largely ignored or overlooked by the workers in the art of designing electrodes. This was not trivial or obvious to one of ordinary skills in the art. This is further explained as follows:

The conductive filaments of the instant application, such as CNTs, CNFs, and NGPs, have a diameter or thickness less than 500 nm (mostly <100 nm). The anode or cathode active material coating (e.g., lithium for the anode or sulfur for the cathode) is preferably less than 500 nm in thickness, and more preferably less than 100 nm in thickness. The ratio between the coating layer thickness and the underlying filament diameter is a critically important parameter in the design of the instantly invented anode or cathode structure. The goal here is to obtain an active material-coated nano-filament with a high proportion of electrode active material relative to the nano-filament proportion because it is the active material (not the underlying nano-filament) that absorbs or desorbs lithium ions (at the cathode side), hence dictating the lithium storage capacity of the battery. This is a particularly important issue for the cathode since the cathode active material typically has a relatively low specific Li storage capacity as compared to the anode active material (lithium metal in the present case). One would want to have as much cathode active material (as little non-active, supporting material) as possible. If the coating thickness-to-filament diameter ratio is critically important, then why does the absolute diameter of a nano-filament matter?

Let us begin the discussion by using, as an example, a small-diameter nano-filament (say 100 nm for a multi-walled CNT or CNF) having thereon a cathode active material coating of 50 nm in thickness (e.g. sulfur and/or lithium sulfide). Then, the volume fraction of the coating (with respect to the total volume of the coating layer and the filament together) will be 75%. Now consider a large-diameter fiber (say 12 µm for Chu's carbon fibers), the cathode coating layer (sulfur or lithium sulfide) has to be 6 µm thick in order to have a 75% cathode active material. This implies that the Lithium ions near the cathode have to travel (via diffusion) a distance of up to 6 μm during the battery discharge process. In contrast, the required diffusion path for the Lithium ions in our Lithium sulfide-coated CNT is only 50 nm. The required time can be reduced by a factor of $(6 \times 10^3/50)^2 = 14,400$ since $D \cdot t = X^2$ (an approximation known in the field of diffusion theory), where D=diffusion coefficient, t=diffusion time, and X=diffusion distance. This implies that the battery charge/discharge rate can be improved by up to 4 orders of magnitude with the instantly invented cathode. Since sulfur is highly insulating (resistant to electron transport), a thick sulfur layer means a high internal resistance for the cathode. Furthermore, a necessarily thick cathode active material coating (on large-diameter fibers) implies a high tendency to get fragmented (pulverized) when the charge-discharge cycles continue (particularly for lithium metal oxide-type cathode active materials).

The above remarks have further shown that the instant nano-structure (if used as a cathode structure) was not just an expedient variation of any prior art work or a mere variation of filament size to achieve optimization of properties. For instance, Chu did not suggest the approach of coating a thin film of a cathode active material (sulfur or lithium sulfide) on the surface of micron-sized fibers (Chu suggested elemental sulfur precipitated out as particles), let alone coating on nano-filaments that are totally different classes of materials. Rather, Chu obtained a mixture of sulfur, carbon black (electronically conductive additive), polyethylene oxide (ion-conductive additive), and other additives and directly coated this mixture to a stainless steel cathode current collector.

The interconnected network of nano-filaments forms a continuous path for electrons, resulting in significantly reduced internal energy loss or internal heating for either the anode or the cathode (or both). This network is electronically connected to a current collector and, hence, all filaments are essentially connected to the current collector. In the instant invention, the lithium sulfide coating is wrapped around a filament and, even if the coating were to fracture into separate segments, individual segments would still remain in physical contact with the underlying filament, which is essentially part of the current collector. The electrons transported to the cathode can be distributed to all cathode active coatings.

In the case of lithium sulfide particles or salt dispersed/dissolved in an electrolyte inside nano pores of the cathode nano-structure, the particles are necessarily nano-scaled (the salt-electrolyte solution pool also nano-scaled) and, hence, are conducive to fast cathode reaction during the charging operation.

The lithium metal cell of the instant application can have a nano-structured anode or a more conventional anode structure, although such a conventional structure is not preferred. In a more conventional anode structure, acetylene black, carbon black, or ultra-fine graphite particles may be used as a conductive additive. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. Preferable mixing ratio of these ingredients may be 80 to 95% by weight for the anode active material (natural or artificial graphite particles, MCMBs, coke-based anode particles, carbon-coated Si nano particles, etc), 3 to 20% by weight for the conductive additive, and 2 to 7% by weight for the binder. The anode current collector may be selected from copper foil or stainless steel foil. The cathode current collector may be an aluminum foil or a nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

Preferably, multiple conductive filaments are processed to form an aggregate or web, characterized in that these filaments are intersected, overlapped, or somehow bonded to one another to form a network of electron-conducting paths. Although not a necessary condition, a binder material may be used to bond the filaments together to produce an integral web. The binder material may be a non-conductive material, such as polyvinylidene fluoride (PVDF) and poly(tetrafluoroethylene) (PTFE). However, an electrically conductive binder material is preferred, which can be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline). The aggregate or web has substantially interconnected pores that are intended for accommodating an electrode active material and electrolyte.

The nano-filament may be selected from, as examples, a carbon nano fiber (CNF), graphite carbon fiber (GNF), carbon nano-tube (CNT), metal nano wire (MNW), metal-coated nano fiber, nano-scaled graphene platelet (NGP), or a combination thereof. The filament is characterized by having an elongate axis (length or largest dimension) and a first transverse dimension (smallest dimension, such as a thickness of an NGP or a diameter of a fiber, tube, or wire) wherein the thickness or diameter is smaller than 100 nm and the length-to-diameter or length-to-thickness ratio is no less than 10, preferably greater than 100. In the case of an NGP, the platelet has a length, a width, and a thickness, wherein the length-to-width ratio is preferably at least 3 and the length-to-thickness ratio is typically greater than 1,000.

The most important property of a filament herein used to support or confine an electrode active material (e.g., lithium sulfide at the cathode or Si at the anode) is a high electrical conductivity to enable facile transport of electrons with minimal resistance. A low conductivity implies a high resistance and high energy loss, which is undesirable. The filament should also be chemically and thermo-mechanically compatible with the intended active material (i.e., lithium at the anode) to ensure a good contact between the filament and the coating upon repeated charging/discharging and heating/cooling cycles.

In the present application, nano-wires primarily refer to elongate solid core structures with diameters below approximately 100 nm and nanotubes generally refer to elongate, single or multi-walled hollow core structures with diameters below approximately 100 nm. Whiskers are elongate solid core structures typically with a diameter greater than 100 nm. However, carbon nano tubes (CNTs) specifically refer to hollow-core structures with a diameter smaller than 10 nm. Both hollow-cored and solid-cored carbon- or graphite-based filaments with a diameter greater than 10 nm are referred to as carbon nano fibers (CNFs) or graphite nano fibers (GNFs), respectively. Graphite nano fibers are typically obtained from carbon nano fibers through a heat treatment (graphitization) at a temperature greater than 2,000° C., more typically greater than 2,500° C.

Catalytic growth is a powerful tool to form a variety of wire or whisker-like structures with diameters ranging from just a few nanometers to the micrometer range. A range of phases (gas, solid, liquid, solution, and supercritical fluid) have been used for the feeder phase, i.e. the source of material to be incorporated into the nano-wire.

A range of metal catalysts have been shown to work for the synthesis of carbon nano fibers and CNTs. For instance, pyrolysis of ethanol can be used in the presence of Fe, Co or Ni (the most common catalysts), Pt, Pd, Cu, Ag, or Au for the growth of single-walled carbon nanotubes (SW-CNT). For the latter three metals to work, not only do they have to be clean to start with, they must also be smaller than 5 nm in diameter for growth to be efficient. Both CNTs and vapor-grown CNFs are now commercially available, but at an extremely high cost. Metal nano wires can be produced using solution phase reduction, template synthesis, physical vapor deposition, electron beam lithography, and electrodeposition. These are now well-known in the art and CNTs, CNFs, and nano-wires are commercially available from multiple sources.

The nano graphene platelets (NGPs) may be obtained from intercalation, exfoliation, and separation of graphene sheets in a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase microbead, meso-phase pitch, graphitic coke, or polymeric carbon. For instance, natural graphite may be subjected to an intercalation/oxidation treatment under a condition comparable to what has been commonly employed to prepare the so-called expandable graphite or stable graphite intercalation compound (GIC). This can be accomplished, for instance, by immersing graphite powder in a solution of sulfuric acid, nitric acid, and potassium permanganate for preferably 2-24 hours (details to be described later). The subsequently dried product, a GIC, is then subjected to a thermal shock (e.g., 1,000° C. for 15-30 seconds) to obtain exfoliated graphite worms, which are networks of interconnected exfoliated graphite flakes with each flake comprising one or a multiplicity of graphene sheets. The exfoliated graphite is then subjected to mechanical shearing (e.g., using an air milling, ball milling, or ultrasonication treatment) to break up the exfoliated graphite flakes and separate the graphene sheets. The platelet surfaces can be readily deposited with a coating of the active material. We have found that intercalation and exfoliation of graphite fibers result in the formation of NGPs with a high length-to-width ratio (typically much greater than 3). The length-to-thickness ratio is typically much greater than 100.

Another particularly preferred class of electrically conductive filaments includes nano fibers obtained via electro-spinning of polymer-containing fluids or pitch. The main advantage of electro-spinning is the ability to produce ultra-fine fibers ranging from nanometer to submicron in diameter. The electro-spinning process is fast, simple, and relatively inexpensive. The process can be used to form fibers from a wide range of polymer liquids in solution or melt form. The polymer may contain a desired amount of conductive additives to make the spun fibers electrically conductive. Because of the extremely small diameters and excellent uniformity of electro-statically spun fibers, high-quality non-woven fabrics or webs having desirable porosity characteristics can be readily produced by this technique. Many electro-spun polymer fibers can be subsequently heat-treated or carbonized to obtain carbon nano fibers. For instance, polyacrylonitrile (PAN), copolymers of pyromellitic dianhydride (PMDA) and 4,4'-oxydianiline (ODA), and CNT- or NGP-containing PAN can be made into a solution, which is then electro-spun into nanometer fibers. The fibers can be successfully carbonized at 1000° C. to produce carbon fiber webs with a tensile strength of 5.0 MPa (or much higher if containing CNTs or NGPs) and an electrical conductivity of >2.5 S/cm. The electrical conductivity can be increased by up to 4 orders of magnitude if the carbonized fiber is further graphitized at a temperature higher than 2,500° C.

The polymer nano fibers can be electrically conductive if the precursor polymer is intrinsically conductive (e.g., conjugate chain polymers such as polyaniline, PANi). Conductive fillers, such as carbon black, nano metal particles, CNTs, and NGPs, may be added to the polymer solution prior to electro-spinning. The resulting electro-spun fibers will be electrically conductive. A polymer fiber may become surface-conductive if the fiber surface is deposited with a conductive material, such as copper or conductive polymer. In addition, carbonization and optional graphitization of a polymer fiber can significantly increase the electrical conductivity. A major advantage of electro-spun and carbonized nano fibers is its low cost, which can be an order of magnitude less expensive than vapor-grown CNFs and two orders of magnitude less expensive than CNTs.

Figure 3:
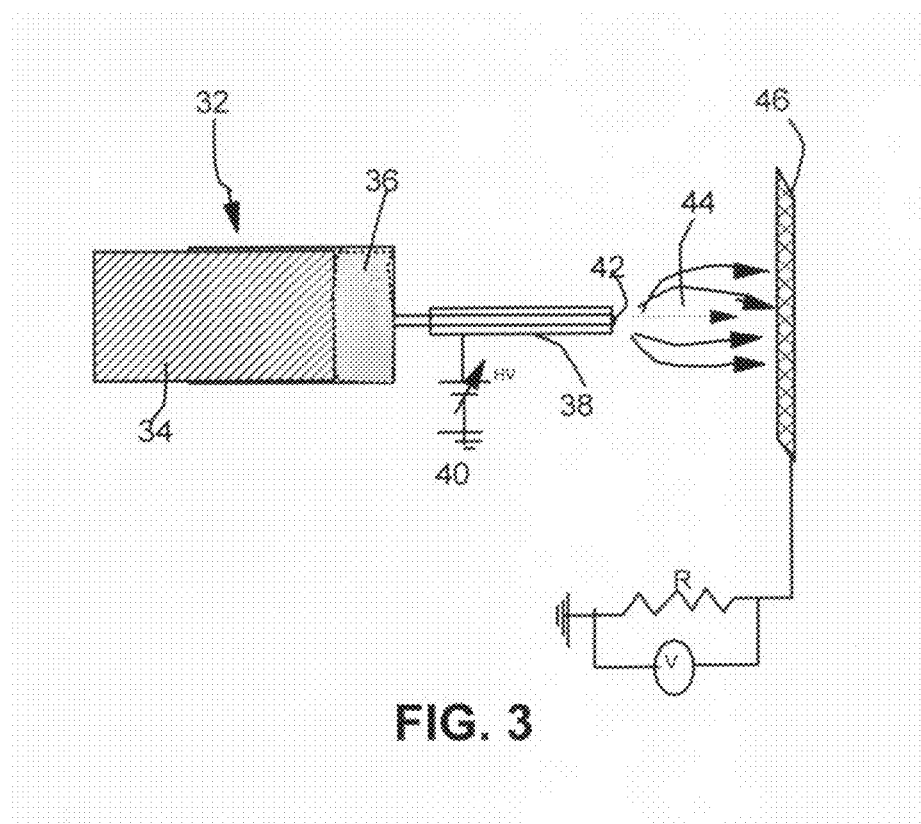
FIG. 3 Schematic of an electro-spinning apparatus to produce nano-fibers.

For illustration purposes, electro-spinning of a polymer or a polymer containing a conductive additive (e.g., NGPs or carbon black) is herein described. As schematically shown in FIG. 3, the process begins with the preparation of a polymer solution and, if NGPs are needed, dispersion of NGPs in a polymer-solvent solution to prepare a suspension solution, which is contained in a chamber 36 of a syringe-type configuration 32. The syringe may be connected to a metering pump or simply contains a drive cylinder 34, which can be part of a metering device. A metal-coated syringe needle 38 serves as an electrode, which is connected to a high-voltage power supply 40. When a proper voltage is applied, charges begin to build up in the suspension. At a critical charge level, repulsive forces overcome the surface tension of the suspension, ejecting streams of fluid out of an orifice 42. The streams of suspension, in the form of thin, elongated fibrils 44, move toward a collector screen 46 while the solvent vaporizes, leaving behind dried fibrils that are collected on the screen, which may be electrically grounded or at a potential different than the potential at the needle electrode 48. The collector screen 46 serves to collect the nanocomposite fibrils produced. Electro-spinning apparatus are well-known in the art.

In a best mode of practice for producing electro-spun NGP-containing polymer nano fibers, the preparation of a suspension solution for electro-spinning is accomplished by first preparing two solutions (A=solvent+NGPs and B=solvent+polymer) and then mixing the two solutions together to obtain the suspension solution. The NGPs may be added to a solvent with the resulting suspension being subjected to a sonication treatment to promote dispersion of separate NGPs in the solvent. This fluid is a solvent for the polymer, not for the NGPs. For NGPs, this fluid serves as a dispersing medium only. The resulting suspension solution is hereinafter referred to as Suspension A. Suspension solution B is obtained by dissolving the polymer in the solvent with the assistance of heat and stirring action. Suspensions A and B are then mixed together and, optionally, sonicated further to help maintain a good dispersion of NGPs in the polymer-solvent solution.

With a syringe needle nozzle tip of approximately 2-5 μm, the resulting nanocomposite fibrils have a diameter typically smaller than 300 nm and more typically smaller than 100 nm. In many cases, fibrils as small as 20-30 nm in diameter can be easily obtained. It is of great interest to note that, contrary to what would be expected by those skilled in the art, the NGP loading in the resulting nanocomposite fibrils could easily exceed 15% by weight. This has been elegantly accomplished by preparing the suspension solution that contains an NGPto-polymer weight ratio of 0.15/0.85 with the ratio of (NGP+polymer) to solvent being sufficiently low to effect ejection of the suspension into fine streams of fluid due to properly controlled suspension viscosity and surface tension. Typically, the (NGP+polymer)-to-solvent ratio is between 1/5 and 1/10. The excess amount of solvent or dispersion agent was used to properly control the fluid properties as required. The solvent or dispersing agent can be quickly removed to produce dried nanocomposite fibrils with the desired NGP loading. The NGPs have a thickness preferably smaller than 10 nm and most preferably smaller than 1 nm. Preferably, the NGPs have a width or length dimension smaller than 100 nm and further preferably smaller than 30 nm. These NGP dimensions appear to be particularly conducive to the formation of ultra-fine diameter nanocomposite fibrils containing a large loading of NGPs.

Preferred matrix polymers are polyacrylonitrile (PAN) and a mixture of polyaniline (PANi) and polyethylene oxide (PEO). PAN fibrils obtained by electro-spinning can be readily converted into carbon nano fibers by heating the fibrils at a temperature of 150° C. to 300° C. in an oxidizing environment and then carbonizing the oxidized fibers at a temperature of 350° C. to 1,500° C. If further heat-treated at a temperature of 2,000° C. and 3,000° C., the carbon nano fibers become graphite nano fibers. The fibrils of the (PANi+PEO) mixture are intrinsically conductive and do not require any carbonization treatment. Electro-spinning also enables fibrils to intersect and naturally bond to one another for forming a web that has a desired network of conductive filaments.

For cathode application, the active material may be in a particle or coating form that is bonded or attached to the surfaces of filaments. The filaments form a network of electron transport paths for dramatically improved electrical conductivity or reduced internal resistance (hence, reduced energy loss and internal heat build-up). It appears that the mechanical flexibility and strength of the conductive filaments selected in the present study enables the coating to undergo strain relaxation quite freely in the radial directions during the charge-discharge cycling of the lithium battery. Consequently, the coating appears to remain in a good contact with the underlying filaments. Due to adequate strength and toughness, the filaments remain essentially intact when the coating undergoes expansion or contraction. No significant fragmentation of the coating was observed in all of the coated nano filaments investigated. Even if the coating were to get fractured into several segments, individual segments are still wrapped around a conductive filament and would not lose their electrical connection the anode current collector.

Figure 4:
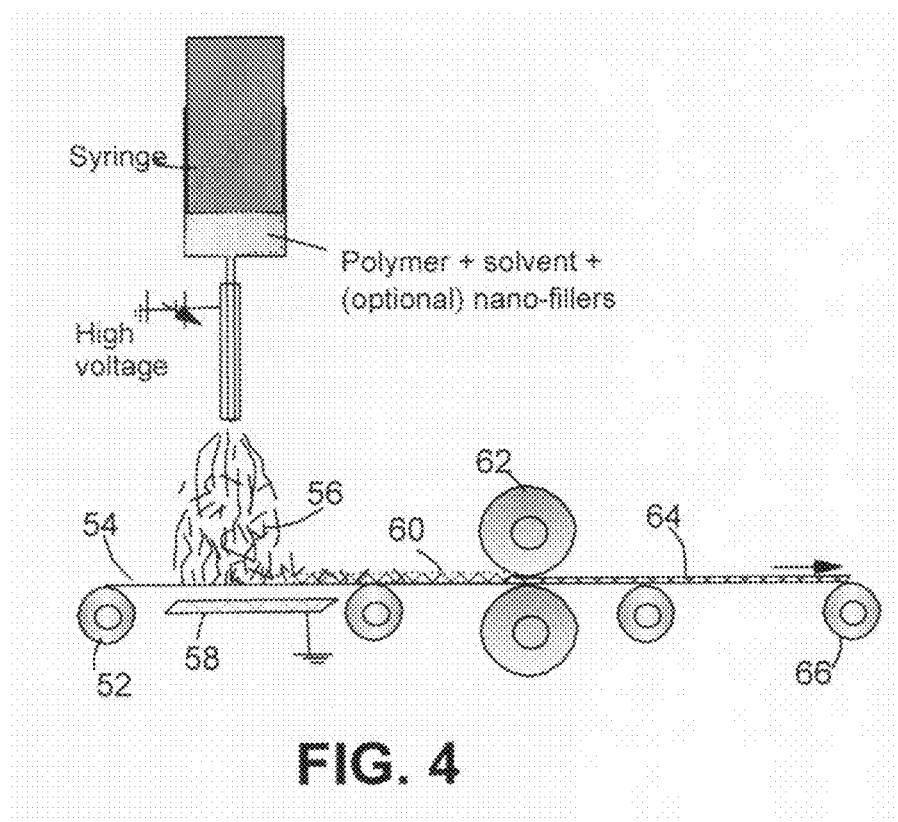
FIG. 4 Schematic of a roll-to-roll apparatus for producing a roll of mats or webs from electro-spun nano-fibers.

Multiple filaments can be easily combined to form an aggregate, such as in a mat, web, non-woven, or paper form. In the case of electro-spun fibrils, the fibrils may naturally overlap one another to form an aggregate upon solvent removal. Schematically shown in FIG. 4 is an innovative roll-to-roll process for continuously producing rolls of electro-spun nano fibril-based porous thin film, paper, mat, or web. The process begins with reeling a porous substrate 54 from a feeder roller 52. The porous substrate 54 is used to capture the electro-spun nano fibrils 56 that would otherwise be collected by a stationary collector 58 (disposed immediately below the moving substrate), which is now just a counter electrode for the electro-spinning apparatus disposed above the moving substrate. The collected fibril mat 60 may be slightly compressed by a pair of rollers 62. The rollers may be optionally heated to melt out the polymer surface in the nano fibrils to consolidate the mat 64 into an integral web. The web, paper, or mat may be continuously wound around a take-up roller 66 for later uses.

Several techniques can be employed to fabricate a conductive aggregate of filaments (a web or mat), which is a monolithic body having desired interconnected pores. In one preferred embodiment of the present invention, the porous web can be made by using a slurry molding or a filament/binder spraying technique. These methods can be carried out in the following ways:

As a wet process, an aqueous slurry is prepared which comprises a mixture of filaments and, optionally, about 0.1 wt % to about 10 wt % resin powder binder (e.g., phenolic resin). The slurry is then directed to impinge upon a sieve or screen, allowing water to permeate through, leaving behind filaments and the binder. As a dry process, the directed fiber spray-up process utilizes an air-assisted filament/binder spraying gun, which conveys filaments and an optional binder to a molding tool (e.g., a perforated metal screen shaped identical or similar to the part to be molded). Air goes through perforations, but the solid components stay on the molding tool surface.

Figure 5:
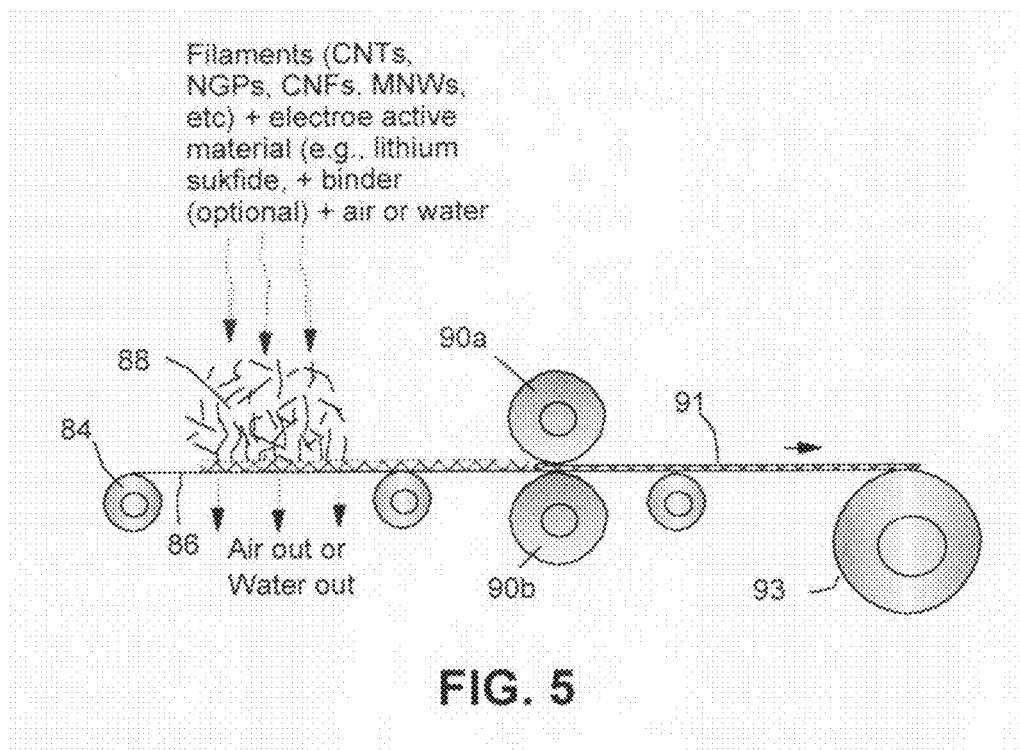
FIG. 5 Schematic of a roll-to-roll apparatus for producing a roll of mats or webs from various conductive filaments.

Each of these routes can be implemented as a continuous process. For instance, as schematically shown in FIG. 5, the process begins with pulling a substrate 86 (porous sheet) from a roller 84. The moving substrate receives a stream of slurry 88 (as described in the above-described slurry molding route) from above the substrate. Water sieves through the porous substrate with all other ingredients (a mixture of filaments, stabilized lithium particles, and a binder) remaining on the surface of the substrate being moved forward to go through a compaction stage by a pair of compaction rollers 90a, 90b. Heat may be supplied to the mixture before, during, and after compaction to help cure the thermoset binder for retaining the shape of the resulting web or mat. The web or mat 91, with all ingredients held in place by the thermoset binder, may be stored first (e.g., wrapped around a roller 93).

Similar procedures may be followed for the case where the mixture 88 of filaments, stabilized lithium particles, and the binder is delivered to the surface of a moving substrate 86 by compressed air, like in a directed fiber/binder spraying route described above. Air will permeate through the porous substrate with other solid ingredients trapped on the surface of the substrate, which are conveyed forward. The subsequent operations are similar than those involved in the slurry molding route.

In yet another preferred embodiment, the web may be made from nano filaments (such as NGPs, GNFs, CNTs, and metal nano wires) using a conventional paper-making process, which is well-known in the art.

Another embodiment of the present invention is a process for producing an electrochemical cell as described above. The process comprises: (a) preparing a nano-structure of electrically conductive nanometer-scaled filaments that are interconnected to form a porous network of electron-conducting paths; (b) depositing a nano-scaled coating of sulfur or sulfur compound onto a surface of the nano-scaled filaments to obtain a coated nano-structure having a coating thickness less than 500 nm (preferably less than 100 nm); (c) obtaining a cathode by chemically or electro-chemically converting the sulfur or sulfur compound coating into a lithium polysulfide to obtain an integrated structure of nano-filaments comprising lithium polysulfide; and (d) combining this cathode with an anode, an electrolyte or an electrolyte-separator assembly to form the electrochemical cell. This cell may be a Li metal cell or Li ion cell with various different anodes.

Preferably, in the aforementioned process for producing an electrochemical cell the step (c) of electro-chemically converting the sulfur or sulfur compound may be accomplished by (i) immersing the coated nano-structure as a first electrode in an electrolyte; (ii) immersing a lithium metal or lithium-containing conductor as a second electrode in the electrolyte; and (iii) imposing a current onto the first and second electrodes, a procedure similar to electro-plating or electro-deposition. In this electro-deposition procedure, the lithium source electrode can be in the form of a bulk lithium plate or rod, which is not difficult to handle in an electro-deposition or plating environment due to a relatively low surface-to-volume ratio and the relative insensitivity of Li rod for plating electrode application. This is in contrast to the much more challenging task of handling lithium foil in a lithium metal cell manufacturing environment where high surface-area Li metal foil is highly sensitive to the presence of oxygen and moisture for the anode application.

It may be noted that a nano-structure of conductive nanofilaments (e.g., in the form of a web, mat, or paper) is a good electrode for electro-plating or electro-deposition. The material to be plated or coated onto filament surfaces can come directly from precursor material in an electrolyte without having pre-coated sulfur. Hence, still another embodiment of the present invention is a process for producing an electrochemical cell, such as a lithium metal cell or lithium ion cell. The process includes: (a) preparing a nano-structure of electrically conductive nanometer-scaled filaments that are interconnected to form a porous network of electron-conducting paths; (b) immersing the nano-structure as a first electrode in a lithium polysulfide-containing electrolyte; (c) immersing a lithium metal or lithium-containing conductor as a second electrode in the electrolyte; (d) imposing a current onto the first and second electrodes to electrochemically produce a lithium polysulfide-coated nano-structure for use as a cathode; and (e) combining the cathode with an anode, an electrolyte or an electrolyte-separator assembly to form the electrochemical cell.

A wide range of electrolytes can be used for practicing the instant invention. Most preferred are non-aqueous, polymer gel, and solid-state electrolytes although other types can be used. Polymer, polymer gel, and solid-state electrolytes are preferred over liquid electrolyte.

The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) effective in suppressing the reductive or oxidative decomposition of electrolyte; and (b) high in conductivity. A non-aqueous electrolyte solely composed of ethylene carbonate (EC) is advantageous in that it is relatively stable against carbonaceous filament materials. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

Solid lithium-ion conductors such as single crystals of $Li_3N$, glasses from the $LiI$—$Li_2S$—$B_2S_3$ system, and polymer electrolytes exhibit high ionic conductivity and, hence, can be used as a solid-state electrolyte in the presently invented cell. Solid ionic conductors based on a $LiM_2(PO_4)_3$ [M=Ti, Ge, etc. is a metal] structure analogous to a Nasicon-type structure, are a preferred group of oxide-based solid-state lithium-ion conductors. A particularly preferred group is lithium aluminum germanium phosphate (LAGP) glass-ceramic solid electrolytes primarily consisting of $Li_{1+x}Al_xGe_{2-x}(PO_4)_3$ (x=0.1-0.5) with superionic conductivity, as disclosed by Thokchom, et al [Thokchom, J. S., N. Gupta, and B. Kumar, "Superionic Conductivity in a LithiumAluminum Germanium Phosphate Glass-Ceramic," Journal of the Electrochemical Society, 2008. 155 (12) A915-A920]. The highly conductive phase is a derivative of $LiGe_2(PO_4)_3$ which possesses a rhombohedral structure (space group R3̄C) with an open three-dimensional framework of $GeO_6$ octahedra sharing all corners with PO$_4$ tetrahedra. The lithium-ion occupies interstitial sites and its conduction takes place along the c-axis. The structure of LAGP implies the existence of Ge—O—P and A-O—P bonds of a covalent nature to form the basic network. The network structure also allows for the presence of conduction channels for fast lithium-ion transport. The lithium conductor exhibits single positive lithium-ion super conduction and no anionic contribution.

A particularly useful electrolyte-separator layer comprises a porous membrane having pores therein and a soft matter phase disposed in the pores, wherein the soft matter phase comprises oxide particles dispersed in a non-aqueous alkali, alkaline, or transition metal salt solution. The oxide particles in a soft matter phase are selected from SiO$_2$, TiO$_2$, Al$_2$O$_3$, MgO, or a combination thereof. The oxide particles preferably have a size smaller than 500 nm, more preferably smaller than 100 nm, and further preferably smaller than 50 nm. The oxide particles have a volume fraction preferably in the range of 2% to 80% based on the total volume of the oxide particles and the lithium salt solution, but more preferably in the range of 5% to 40%. The pores occupy a volume fraction of the porous membrane in the range of 20% to 95% inclusive, but preferably in the range of 50% to 85% inclusive. The pores have a size preferably smaller than 10 µm, but more preferably smaller than 2 µm.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. In several cases, scanning electron microscopy (SEM) and transmission electron microscopy (TEM) were used to characterize the structure and morphology of the hybrid material samples.

A nano-structured cathode, comprising nano-filaments and lithium sulfide, was bonded onto an aluminum foil (a current collector). After solvent removal, web-aluminum foil configuration was hot-pressed to obtain a cathode or, alternatively, a complete cell was fabricated by laminating an anode current collector (Cu foil), an anode layer (e.g., a nano-structured web with Si coating, or graphite particles bonded by PVDF), an electrolyte-separator layer, a nano-structured cathode, and a cathode current collector (e.g., stainless steel foil or aluminum foil) all at the same time. In some cases, an NGP-containing resin was used as a binder, for instance, between a cathode layer and a cathode current collector. Filaments may also be bonded by an intrinsically conductive polymer as a binder to form a web. For instance, polyaniline—maleic acid—dodecyl hydrogensulfate salt may be synthesized directly via emulsion polymerization pathway using benzoyl peroxide oxidant, sodium dodecyl sulfate surfactant, and maleic acid as dopants. Dry polyaniline-based powder may be dissolved in DMF up to 2% w/v to form a solution.

The conventional cathode was prepared in the following way. As an example, 91% by weight of lithium sulfide powder, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 µm) serving as a current collector. The resulting two-layer aluminum foil-active material configuration was then hot-pressed to obtain a positive electrode. In several examples, the same or similar integrated 3-D structure of conductive nano-filaments used in the anode was used to support the cathode active material as well.

In the preparation of a cylindrical cell, a positive electrode, a separator composed of a porous polyethylene film, and a negative electrode was stacked in this order. The stacked body was spirally wound with a separator layer being disposed at the outermost side to obtain an electrode assembly.

The following examples are presented primarily for the purpose of illustrating the best mode practice of the present invention, not to be construed as limiting the scope of the present invention.

Example 1

Conductive Web of Filaments from Electro-Spun PAA Fibrils

Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus schematically shown in FIG. 3. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain Sample c-PI-0 with an average fibril diameter of 67 nm. Such a web can be used to accommodate lithium sulfide, lithium disulfide, or other lithium polysulfide species for the cathode and/or as a conductive substrate for an anode active material.

Example 2

Conductive Web of Filaments from Electro-Spun PAN Fibrils and NGP-Containing PAN Fibrils Suspension solutions were obtained by first preparing two solutions (A=solvent+NGPs and B=solvent+polymer) and then mixing the two solutions together to obtain the suspension solution. In the case of NGP-PAN fibril, the solvent used was N,N,-dimethyl formamide (DMF). For the preparation of Suspension A, the NGPs were added to a solvent and the resulting suspensions were sonicated to promote dispersion of separate NGPs in the solvent with a sonication time of 20 minutes. Suspension solution B was obtained by dissolving the polymer in the solvent with the assistance of heat (80° C. for DMF+PAN) and stirring action using a magnetic stirrer typically for 90 and 30 minutes, respectively. Suspensions A and B were then mixed together and further sonicated for 20 minutes to help maintain a good dispersion of NGPs in the polymer-solvent solution. An electrostatic potential of 10 kV was applied over a distance of 10 cm between the syringe needle tip and a 10 cm×10 cm porous aluminum plate that was grounded.

A range of NGP-polymer proportions in the original suspension solution were prepared (based on (NGP wt.)/(NGP wt.+polymer weight)): 0%, 5%, and 10% for PAN compositions. The resulting nanocomposite fibrils, after the solvent was completely removed, had comparable NGP-polymer ratios as the original ratios. They are designated as Samples PAN-0, PAN-5, and PAN-10, respectively. The average diameters of these fibrils were approximately 75 nm.

The NGP-PAN nanocomposite fibrils were converted to carbon/carbon nanocomposite by heat-treating the fibrils first at 200° C. in an oxidizing environment (laboratory air) for 45 minutes and then at 1,000° C. in an inert atmosphere for 2 hours. The resulting carbonized samples are referred to as Samples c-PAN-5 and c-PAN-10, respectively. NGP-free PAN fibrils were also carbonized under comparable conditions to obtain Sample c-PAN-0. Their diameters became approximately 55 nm. Such a web can be used to accommodate lithium sulfide, lithium disulfide, or other lithium polysulfide for the cathode and/or as a conductive substrate for an anode active material.

Example 3

Preparation of NGP-Based Webs (Webs of NGPs and NGPs+CNFs)

Continuous graphite fiber yarns (Magnamite AS-4 from Hercules) were heated at 800° C. in a nitrogen atmosphere for 5 hours to remove the surface sizing. The yarns were cut into segments of 5 mm long and then ball-milled for 24 hours. The intercalation chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite fibers (20 g) were added under vigorous stirring to avoid agglomeration. After the graphite fiber segments were well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite fiber sample. The dried, expandable graphite fiber sample was quickly placed in a tube furnace preheated to 1,000° C. and allowed to stay inside a quartz tube for approximately 40 seconds to obtain exfoliated graphite worms. The worms were dispersed in water to form a suspension, which was ultrasonicated with a power of 60 watts for 15 minutes to obtain separated NGPs. Approximately half of the NGP-containing suspension was filtered and dried to obtain several paper-like mats, referred to as Sample NGP-100. Vapor grown CNFs were then added to the remaining half to form a suspension containing both NGPs and CNFs (20%), which was dried and made into several paper-like mats (Sample NGP-CNF-20). Approximately 5% phenolic resin binder was used to help consolidate the web structures in both samples. Such a web can be used to accommodate lithium sulfide, lithium disulfide, or other lithium polysulfide for the cathode and/or as a conductive substrate for an anode active material. Alternatively, lithium sulfide particles may be added to the NGP-containing suspension prior to the mat-making procedure. The resulting mat is a nano-structured cathode containing lithium sulfide, lithium disulfide, or other lithium polysulfide disposed in interstitial pores between nano-filaments (NGP or CNF).

Example 4

Preparation of Conductive Webs from CNTs and Vapor-Grown CNFs with Lithium Polysulfide Particles Commercially available CNTs (Cheap Tubes, LLC) and vapor-grown CNFs (Applied Science, Inc., Cedarville, Ohio) were separately made into conductive webs using a conventional paper-making procedure. Basically, a slurry of CNTs or CNFs, plus stabilized lithium particles, was poured over a top surface of a Teflon-based membrane with sub-micron pores. Water permeates through the membrane pores with the assistance of a suction force created by a vacuum pump-generated pressure differential between the top surface and the bottom surface of the membrane. Solid ingredients (CNTs or CNFs) stay on the top surface of the membrane, which may be separated from the membrane and dried to become a sheet of porous paper or mat (Sample CNT and Sample CNF). It may be noted that particles of lithium polysulfide were added to the slurry in several samples and the resulting webs contained lithium polysulfide particles in pores.

Example 5

Dip-Coating of Webs with Lithium Polysulfide Particles

One way to incorporate lithium polysulfide particles in a pre-fabricated web is to use a dip-coating process. In a typical procedure, a CNF-based web prepared in Example 4 was immersed (dipped) in a suspension containing lithium polysulfide particles dispersed in a fluid; e.g. a low molecular weight polyethylene oxide (PEO) that could later become part of a polymer gel phase. This PEO had a melting point lower than 60° C., which gave a relatively low-viscosity fluid at 90° C. The lithium polysulfide particle concentrations (typically 5% to 40% by volume) and the immersion time (typically 1-10 seconds) were adjusted to achieve a desired amount of lithium polysulfide particles embedded in the interstitial spaces (pores) between nano-filaments.

Example 6

Preparation of Lithium Polysulfide Coated Conductive Webs for Cathodes

The first step involves deposition of elemental sulfur on nano-filament surfaces of a mat, web, or paper through, for instance, a sublimation-based physical vapor deposition. Sublimation of solid sulfur occurs at a temperature greater than 20° C., but a significant sublimation rate typically does not occur until the temperature is above 40° C. In a typical procedure, a nano-filament web is sealed in a glass tube with the solid sulfur positioned at one end of the tube and the web near another end at a temperature of 40-75° C. The sulfur vapor exposure time was typically from several minutes to several hours for a sulfur coating of several nanometers to several microns in thickness. A sulfur coating thickness lower than 500 nm is preferred, but more preferred is a thickness lower than 100 nm, most preferred lower than 10 nm.

The second step involves electro-chemical conversion of sulfur to lithium polysulfide coating on nano-filament surfaces. This procedure is similar to an electro-plating process in which lithium metal or lithium coated electrode is used as an anode or a source electrode and a web containing sulfur-coated nano-filaments is used as a cathode. It is not a challenging task to handle lithium metal rod as an electrode in an electro-plating bath, as opposed to the more difficult task in handling Li metal foil in a battery manufacturing environment. A lithium-conductive or lithium-containing liquid is used as the electrolyte. The imposing current density and time can be adjusted to produce the desired type and amount of lithium polysulfide ($Li_2S_x$, where x=1-8) and coating thickness. There is no restriction on the current density magnitude for this application, but a higher current density tends to form a thicker coating, given comparable electro-deposition conditions. A preferred range of current density values is 0.01 $mA/cm^2$ to 2 $A/cm^2$, most preferably from 10 $mA/cm^2$ to 200 $mA/cm^2$. Surprisingly, under electro-plating conditions, the Li ions readily react with the nano-scaled S coating supported by conductive nano-filaments.

Optionally, at the early stages of the process, the level of porosity or pore sizes in a web may be kept at higher values to facilitate sulfur deposition and the formation of lithium polysulfide coating. The coated web may then be compressed to reduce the porosity to a desired extent suitable for use as a cathode.

Alternatively, select lithium polysulfide ($Li_2S_x$, with $2<x\leq8$) may be dissolved in an electrolyte solvent and the resulting solution is used as the electrolyte of an electro-deposition bath in which the cathode is a nano-structured web of conductive nano-filaments and lithium metal as an anode. Thin coating of lithium polysulfide can be coated onto nano-filament surfaces.

Several series of Li metal and Li-ion cells were prepared using the presently prepared cathode. The first series is a Li metal cell containing a copper foil as an anode current collector and the second series is also a Li metal cell having a nano-structured anode of conductive filaments (based on electro-spun carbon fibers) plus a copper foil current collector. The third series is a Li-ion cell having a nano-structured anode of conductive filaments (based on electro-spun carbon fibers coated with a thin layer of Si using CVD) plus a copper foil current collector. The fourth series is a Li-ion cell having a graphite-based anode active material as an example of the more conventional anode.

Comparative Example 7

Solid State Cell with Lithium Foil as Anode and Dried Sulfur Paste as Cathode

A cathode film was made by mixing 50% by weight of elemental sulfur, 13% carbon black, polyethylene oxide (PEO), and lithium trifluoromethanesulfonimide (wherein the concentration of the electrolyte salt to PEO monomer units ($CH_2CH_2O$) per molecule of salt was 49:1], and 5% 2,5-dimercapto-1,3,4-dithiadiazole in a solution of acetonitrile (the solvent to PEO ratio being 60:1 by weight). The components were stir-mixed for approximately two days until the slurry was well mixed and uniform. A thin cathode film was cast directly onto stainless steel current collectors, and the solvent was allowed to evaporate at ambient temperatures. The resulting cathode film weighed approximately 0.0030-0.0058 $gm/cm^2$.

The polymeric electrolyte separator was made by mixing PEO with lithium trifluoromethanesulfonimide, (the concentration of the electrolyte salt to PEO monomer units ($CH_2CH_2O$) per molecule of salt being 39:1) in a solution of acetonitrile (the solvent to polyethylene oxide ratio being 15:1 by weight). The components were stir-mixed for two hours until the solution was uniform. Measured amounts of the separator slurry were cast into a retainer onto a release film, and the solvent was allowed to evaporate at ambient temperatures. The resulting electrolyte separator film weighed approximately 0.0146-0.032 $gm/cm^2$.

The cathode film and polymeric electrolyte separator were assembled under ambient conditions, and then vacuum dried overnight to remove moisture prior to being transferred into the argon glovebox for final cell assembly with a 3 mil (75 micron) thick lithium anode foil. The anode current collector was Cu foil. Once assembled, the cell was compressed at 3 psi and heated at 40° C. for approximately 6 hours to obtain an integral cell structure.

Example 7

Physical Vapor Deposition (PVD) of Sulfur on Conductive Webs for Cathodes

The PVD procedure is analogous to that in Example 6. In a typical procedure, a non-CNT-based nano-filament web is sealed in a glass tube with the solid sulfur positioned at one end of the glass tube and the web near another end at a temperature of 40-75° C. The sulfur vapor exposure time was typically from several minutes to several hours for a sulfur coating of several nanometers to several microns in thickness. A sulfur coating thickness lower than 100 nm is preferred, but more preferred is a thickness lower than 20 nm, and most preferred is a thickness lower than 10 nm. Several lithium metal cells with or without a nano-structured anode were fabricated, wherein a lithium metal foil was used as a Li ion source.

Example 8

Evaluation of Electrochemical Performance of Various Cells

Charge storage capacities were measured periodically and recorded as a function of the number of cycles. The discharge capacity herein referred to is the total charge inserted into the cathode during the first discharge, per unit mass of the cell (counting both electrode active materials, conductive additives, nano-filaments, binder, and any other additive, if existing). The charge capacity refers to the amount of charges per unit mass of the cell, corresponding to the amount of lithium plated back to the surface of the nano-structured web and/or the anode current collector in a lithium metal cell, or the amount of charges inserted into an anode active material in a Li-ion cell. The morphological or micro-structural changes of selected samples after a desired number of repeated charging and recharging cycles were observed using both transmission electron microscopy (TEM) and scanning electron microscopy (SEM).

Figure 6:
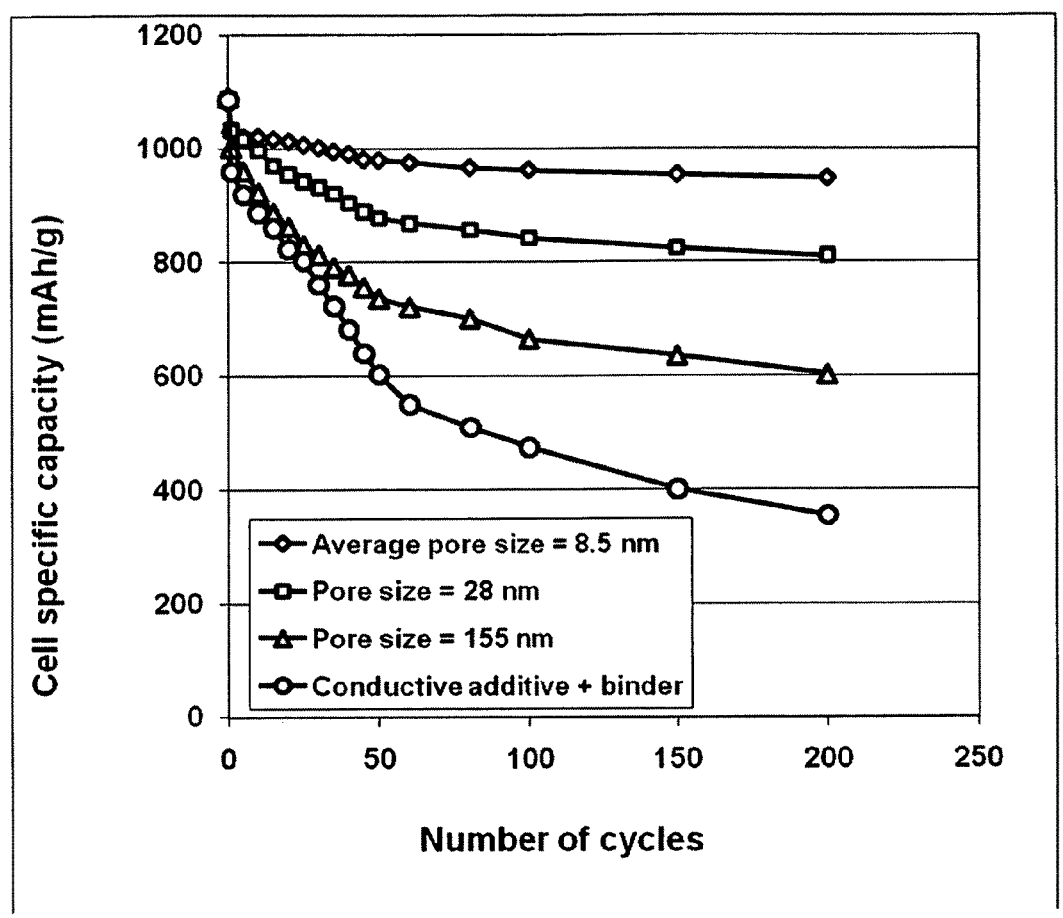
FIG. 6 Specific capacity data from four series of Li-ion cells each with a nano-structured anode of nano-filaments with nano Si coating and polymeric electrolyte. The first three series (top three curves) are Li—S cells with a nano-structured cathode containing approximately 45% active lithium polysulfide coating electro-chemically deposited onto electro-spun carbon nano-fiber surfaces: the first with an average pore size of 8.5 nm, the second 28 nm, and the third 155 nm. The fourth curve is for a Li—S cell in which the cathode was prepared by mixing lithium polysulfide particles with PEO and carbon.

Shown in FIG. 6 are four cell specific capacity series, all being Li-ion cells with a nano-structured anode of nano-filaments with nano Si coating (approximately 65% by weight of the total anode material weight) and polymeric electrolyte described in Comparative Example 7. The first three series (top three curves) are Li—S cells with a nano-structured cathode containing approximately 45% active lithium polysulfide coating electro-chemically deposited onto electro-spun carbon nano-fiber surfaces: the first with an average pore size of 8.5 nm, the second 28 nm, and the third, 155 nm. The fourth curve is for a Li—S cell in which the cathode was prepared by mixing lithium sulfide particles with PEO and carbon black using a procedure similar to that described in Comparative Example 7.

These data clearly demonstrate that the presently invented nano-structured cathode technology provides a highly effective platform for designing ultra-high-capacity Li-ion batteries. A reversible specific capacity of the Li-ion cell based on the total electrode weights (anode+cathode+electrolyte/, excluding current collectors, casing, and other overhead weights) as high as 945 mAh/g for a nano-structured cathode with an average pore size of 8.5 nm can be achieved even after 200 cycles. This is in stark contrast to the commonly achieved cell specific capacity of <150 mAh/g in commercially available cells. In general, the smaller the pores, the more effective of the cathode in retaining the charge storage capacity. Even with an average pore size of 155 nm, the nano-structured cathode still enables the Li-ion cell to maintain a relatively high capacity as compared to a conventional cathode prepared by mixing the lithium polysulfide with conductive additive particles and a resin binder.

It may be note that with a designed operating voltage of 2.2 volts, an exceptional specific energy as high as 2,000 kW/kg (based on the total weight of electrodes and electrolyte only) can be achieved with the presently invented technology. This is far superior to the very best specific energy of any prior art lithium metal or lithium ion cell ever reported.

Figure 7:
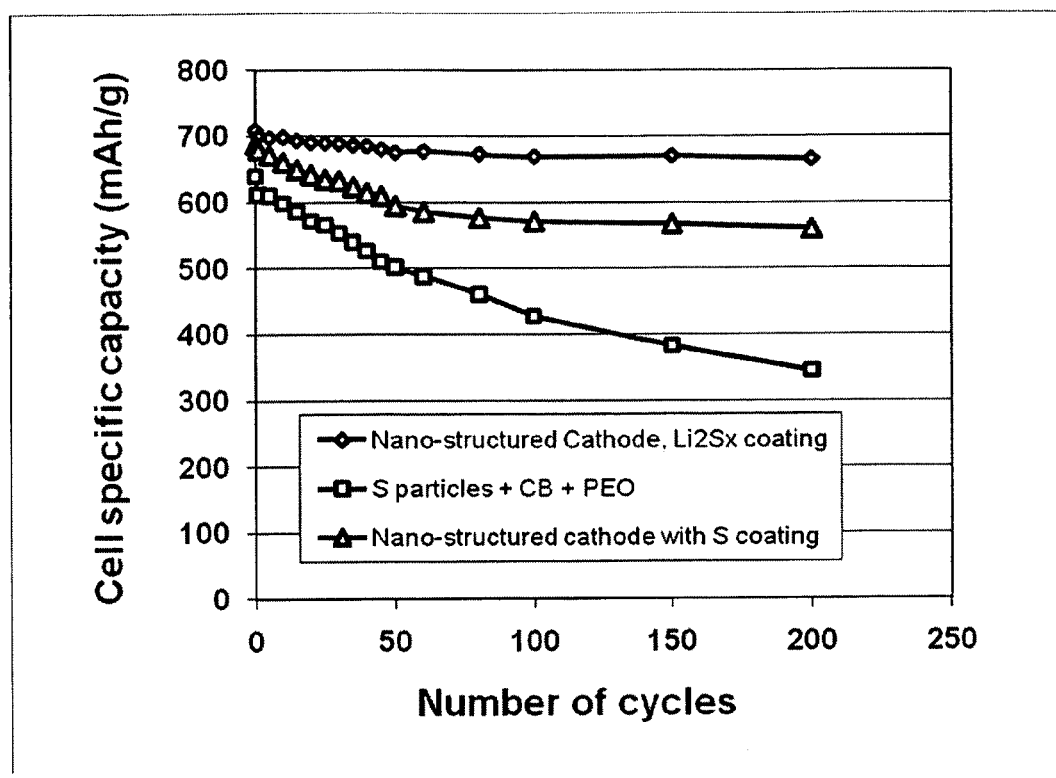
FIG. 7 Cell specific capacity behaviors of three Li metal-sulfur cells (all with 54% active sulfur at the cathode, but with 70% active Li at the nano-structured anode). The first cell (top curve) features a cathode prepared by electro-chemical conversion of a PVD deposited sulfur coating on nano-filaments. The second cell (middle curve) features a cathode prepared by physical vapor deposition of sulfur coating on the filament surface of a nano-structured cathode, but with stabilized Li metal particles mixed in a nano-structured anode. The third cell features a cathode prepared by mixing elemental sulfur with carbon black and other additives, followed by coating the resulting paste on a stainless steel current collector (lower curve).

FIG. 7 shows the cell specific capacity behaviors of three comparable Li metal-sulfur cells (all with 54% active sulfur at the cathode, but with 70% active Li at the nano-structured anode). A solid electrolyte, lithium aluminum germanium phosphate, $Li_{1+x}Al_xGe_{2-x}(PO_4)_3$, where x=0.5, was used in all three cases. The first cell (top curve) features a cathode prepared by electro-chemical conversion of a PVD S coating on nano-filaments as described in Example 6. The second cell (middle curve) features a cathode prepared by physical vapor deposition of sulfur on the filament surface of a nano-structured cathode with stabilized Li metal particles mixed in a nano-structured anode. The third cell features a cathode prepared by mixing elemental sulfur with carbon black and other additives, followed by coating the resulting paste on a stainless steel current collector (lower curve).

The cell with electrochemically deposited lithium polysulfide coating on the filament surface of a nano-structured cathode shows a very stable cycling behavior with very little capacity fade after 200 charge-discharge cycles. Quite surprisingly, the cell with physical vapor deposited sulfur coating on the filament surface of a nano-structured cathode also shows a relatively stable cycling behavior with some capacity fade after 200 charge-discharge cycles, but the overall reversible capacity is lower than that of the top curve. The reason for this difference is not very clear, but one may speculate that some of the sulfur in the sample (represented by the middle curve) might not have fully participated in the cathode reactions. Further, the cell without a nano-structured cathode suffers a much higher capacity decay rate. It seems that some of the sulfur particles at the cathode gradually lost contact with the carbon black or, indirectly, with the current collector and, hence, they no longer were effective in serving as a cathode active material.

In summary, the present invention provides an innovative, versatile, and surprisingly effective platform materials technology that enables the design and manufacture of superior cathode materials and structures for lithium metal and lithium-ion rechargeable batteries. There was no prior art work reported on the instant inventions. Clearly, the instant inventions are not obvious extension of any prior art work and could not have been anticipated based on any prior art work.

The invention claimed is:

1. A lithium metal-sulfur or lithium ion-sulfur secondary cell comprising a nano-structured anode, a separator and/or electrolyte, and a nano-structured cathode, wherein said nano-structured anode comprises an integrated structure of electrically conductive nanometer-scaled filaments that are interconnected to form a porous network of electron-conducting paths comprising interconnected pores, wherein said filaments have a transverse dimension less than 500 nm, wherein said nano-structured anode provides a sufficient amount of nano-filament surface areas to support lithium metal when the cell is in a charged state, and to prevent geometrically sharp structures or dendrites in the anode, and wherein said cathode comprises:
   a) an integrated nano-structure of electrically conductive nanometer-scaled filaments that are interconnected to form a porous network of electron-conducting paths comprising pores with a size smaller than 100 nm, wherein said filaments have a transverse dimension less than 500 nm and are selected from nano graphene platelets (NGPs) or a combination of NGPs with electro-spun nano fibers, vapor-grown carbon or graphite nano fibers, carbon or graphite whiskers, carbon nano-tubes, carbon nanowires, or metal nano wires; and
   b) powder or salt of lithium-containing sulfide or lithium polysulfide disposed in said pores or a thin coating of lithium-containing sulfide deposited on a nano graphene platelet surface wherein the lithium-containing sulfide is in contact with said electrolyte, or dispersed or dissolved in a liquid electrolyte, and the lithium-containing sulfide-to-filament weight ratio is between 1/10 and 10/1 which is measured when said cell is in a fully discharged state;
   wherein said pores contain interconnected pores that accommodate and retain lithium-containing sulfide, permitting only $Li^+$ ions to diffuse back and forth between the anode and the cathode for reduced capacity decay.

2. The lithium metal-sulfur or lithium ion-sulfur secondary cell of claim 1 wherein said filaments have a transverse dimension smaller than 100 nm.

3. The lithium metal-sulfur or lithium ion-sulfur secondary cell of claim 1 wherein said pores have a size smaller than 10 nm.

4. The lithium metal-sulfur or lithium ion-sulfur secondary cell of claim 1 wherein said pores have a size smaller than 5 nm.

5. The lithium metal-sulfur or lithium ion-sulfur secondary cell of claim 1 wherein said cell is a lithium metal-sulfur cell.

6. The lithium metal-sulfur or lithium ion-sulfur secondary cell of claim 1 wherein said cell is a lithium ion-sulfur cell.

7. The lithium metal-sulfur or lithium ion-sulfur secondary cell of claim 1, further comprising a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof.

8. The lithium metal-sulfur or lithium ion-sulfur secondary cell of claim 1 wherein said filaments comprise nano graphene platelets with a thickness less than 10 nm.

9. The lithium metal-sulfur or lithium ion-sulfur secondary cell of claim 1 wherein said nano-filaments are bonded by a binder material selected from a resin, a conductive polymer, coal tar pitch, petroleum pitch, meso-phase pitch, coke, or a derivative thereof.

10. The lithium metal-sulfur or lithium ion-sulfur secondary cell of claim 1 wherein said lithium-containing sulfide powder contains nano-scaled lithium sulfide particles disposed in said pores.

11. The lithium metal-sulfur or lithium ion-sulfur secondary cell of claim 1 wherein said lithium-containing sulfide powder is dispersed or dissolved in a liquid electrolyte disposed in said pores.

12. The lithium metal-sulfur or lithium ion-sulfur secondary cell of claim 1 wherein said lithium-containing sulfide powder, salt, or coating contains lithium sulfide, $Li_2S$.

13. A lithium metal-sulfur or lithium ion-sulfur secondary cell comprising a nano-structured anode, a separator and/or electrolyte, and a nano-structured cathode, wherein said cell is a lithium ion-sulfur cell and said nano-structured anode comprises (a) an integrated structure of electrically conductive nanometer-scaled filaments that are interconnected to form a porous network of electron-conducting paths comprising interconnected pores, wherein said filaments have a transverse dimension less than 500 nm; and (b) an anode active material bonded to or in physical contact with said integrated structure, wherein said nano-structured anode prevents geometrically sharp structures or dendrites in the anode, and wherein said cathode comprises:
  A) an integrated nano-structure of electrically conductive nanometer-scaled filaments that are interconnected to form a porous network of electron-conducting paths comprising pores with a size smaller than 100 nm, wherein said filaments have a transverse dimension less than 500 nm and are selected from nano graphene platelets (NGPs) or a combination of NGPs with electro-spun nano fibers, vapor-grown carbon or graphite nano fibers, carbon or graphite whiskers, carbon nano-tubes, carbon nanowires, or metal nano wires; and
  B) powder or salt of lithium-containing sulfide or lithium polysulfide disposed in said pores or a thin coating of lithium-containing sulfide deposited on a nano graphene platelet surface wherein the lithium-containing sulfide is in contact with said electrolyte, or dispersed or dissolved in a liquid electrolyte, and the lithium-containing sulfide-to-filament weight ratio is between 1/10 and 10/1 which is measured when said cell is in a fully discharged state;
  wherein said pores contain interconnected pores that accommodate and retain lithium-containing sulfide, permitting only $Li^+$ ions to diffuse back and forth between the anode and the cathode for reduced capacity decay.

14. The lithium ion-sulfur cell as defined in claim 13, wherein said cell is at a discharged state when said cell is made.

15. The lithium metal-sulfur or lithium ion-sulfur secondary cell of claim 1, wherein said cathode comprises sulfur, sulfur-containing molecule, sulfur-containing compound, sulfur-carbon polymer, or a combination thereof when the cell is in a charged state.

16. The lithium metal-sulfur or lithium ion-sulfur secondary cell of claim 1, wherein said electrolyte is selected from the group consisting of polymer electrolyte, polymer gel electrolyte, solid-state electrolyte, composite electrolyte, ionic liquid electrolyte, non-aqueous liquid electrolyte, soft matter phase electrolyte, and combinations thereof.

17. The lithium metal-sulfur or lithium ion-sulfur secondary cell of claim 1, wherein said electrolyte is selected from the group of solid-state electrolytes consisting of solid ionic conductors based on a $LiM_2(PO_4)_3$ structure, where M is a metal, lithium aluminum germanium phosphates represented by $Li_{1+x}Al_xGe_{2-x}PO_4)_3$, where x=0.1-0.9, glass-ceramic solid electrolytes, and combinations thereof.

18. The lithium metal-sulfur or lithium ion-sulfur secondary cell of claim 1, wherein said cell provides a reversible specific capacity of no less than 400 mAh per gram of the total cell weight including anode, cathode, electrolyte, and separator weights together.

19. The lithium metal-sulfur or lithium ion-sulfur secondary cell of claim 1, wherein said cell provides a reversible specific capacity of no less than 600 mAh per gram of the total cell weight including anode, cathode, electrolyte, and separator weights together.

20. The lithium metal-sulfur or lithium ion-sulfur secondary cell of claim 1, wherein said cell provides a specific energy of no less than 600 Wh/Kg based on the total cell weight including anode, cathode, electrolyte, and separator weights combined.

21. The lithium metal-sulfur or lithium ion-sulfur secondary cell of claim 1, wherein said cell provides a specific energy of no less than 800 Wh/Kg based on the total cell weight including anode, cathode, electrolyte, and separator weights combined.

22. The lithium metal-sulfur or lithium ion-sulfur secondary cell of claim 1, wherein said cell provides a specific energy of no less than 1,000 Wh/Kg based on the total cell weight including anode, cathode, electrolyte, and separator weights combined.

23. A lithium metal-sulfur or lithium ion-sulfur secondary cell comprising nano-structured anode, a separator and/or electrolyte, and a nano-structured cathode, wherein said nano-structured anode comprises an integrated structure of electrically conductive nanometer-scaled filaments that are interconnected to form a porous network of electron-conducting paths comprising interconnected pores, wherein said filaments have a transverse dimension less than 500 nm, wherein said nano-structured anode provides a sufficient amount of nano-filament surface areas to support lithium metal when the cell is in a charged state, and to prevent geometrically sharp structures or dendrites in the anode, and wherein said cathode comprises:
  a) an integrated structure of electrically conductive, non-carbon nanotube-based, nanometer-scaled filaments that are interconnected to form a porous network of electron-conducting paths comprising pores with a size smaller than 100 nm, wherein said filaments have a transverse dimension less than 500 nm and is selected from nano graphene platelets (NGPs) or a combination of NGPs with electro-spun nano fibers, vapor-grown carbon or graphite nano fibers, carbon or graphite whiskers, carbon nano-tubes, carbon nanowires, or metal nano wires; and
  b) a cathode active material comprising sulfur, sulfur-containing molecule, sulfur-containing compound, or sulfur-carbon polymer disposed in said pores wherein the cathode active material is in contact with said electrolyte, and the cathode active material-to-filament weight ratio is between 1/10 and 10/1 which is measured when said cell is in a fully discharged state;
  wherein said pores contain interconnected pores that accommodate and retain lithium-containing sulfide, permitting only $Li^+$ ions to diffuse back and forth between the anode and the cathode for reduced capacity decay.

24. The lithium metal-sulfur or lithium ion-sulfur secondary cell of claim 23 wherein said filaments have a transverse dimension smaller than 100 nm.

25. The lithium metal-sulfur or lithium ion-sulfur secondary cell of claim 23 wherein said pores have a size smaller than 10 nm.

26. The lithium metal-sulfur or lithium ion-sulfur secondary cell of claim 23 wherein said pores have a size smaller than 5 nm.

27. The lithium metal-sulfur or lithium ion-sulfur secondary cell of claim 23 wherein said cell is a lithium metal-sulfur cell.

28. The lithium metal-sulfur or lithium ion-sulfur secondary cell of claim 23 wherein said cell is a lithium ion-sulfur cell.

29. The lithium metal-sulfur or lithium ion-sulfur secondary cell of claim 23 wherein said filaments comprise an electrically conductive material selected from the group consisting of electro-spun nano fibers, vapor-grown carbon or graphite nano fibers, carbon or graphite whiskers, carbon nanowires, nano graphene platelets, metal nano wires, and combinations thereof.

30. The lithium metal-sulfur or lithium ion-sulfur secondary cell of claim 23, further comprising a fiber selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof.

31. The lithium metal-sulfur or lithium ion-sulfur secondary cell of claim 23 wherein said filaments comprise nano graphene platelets with a thickness less than 10 nm.

32. The lithium metal-sulfur or lithium ion-sulfur secondary cell of claim 23 wherein said filaments comprise a nano graphene platelet containing nano-scale carbon nodules or bumps adhered to a surface of said graphene platelet.

33. The lithium metal-sulfur or lithium ion-sulfur secondary cell of claim 23 wherein said nano-filaments are bonded by a binder material selected from a resin, a conductive polymer, coal tar pitch, petroleum pitch, meso-phase pitch, coke, or a derivative thereof.

34. The lithium metal-sulfur or lithium ion-sulfur secondary cell of claim 23, wherein said electrolyte is selected from the group of solid-state electrolytes consisting of solid ionic conductors based on a $LiM_2(PO_4)_3$ structure, where M is a metal, lithium aluminum germanium phosphates represented by $Li_{1+x}AL_xGe_{2-x}PO_4)_3$, where x=0.1-0.9, glass-ceramic solid electrolytes, and combinations thereof.

35. A lithium metal-sulfur or lithium ion-sulfur secondary cell comprising nano-structured anode, a separator and/or electrolyte, and a nano-structured cathode, wherein said nano-structured anode comprises an integrated structure of electrically conductive nanometer-scaled filaments that are interconnected to form a porous network of electron-conducting paths comprising interconnected pores, wherein said filaments have a transverse dimension less than 500 nm, wherein said nano-structured anode provides a sufficient amount of nano-filament surface areas to support lithium metal when the cell is in a charged state, and to prevent geometrically sharp structures or dendrites in the anode, and wherein said cathode comprises:
  a) an integrated nano-structure of electrically conductive nanometer-scaled filaments that are interconnected to form a porous network of electron-conducting paths comprising pores with a size smaller than 100 nm, wherein said filaments have a transverse dimension less than 500 nm and are selected from carbon or graphite whiskers, metal nano wires, nano graphene platelets (NGPs), or a combination graphite whiskers, metal nano wires, or NGPs with electro-spun nano fibers, vapor-grown carbon or graphite nano fibers, carbon nanotubes, or carbon nanowires; and
  b) powder or salt of lithium-containing sulfide or lithium polysulfide disposed in said pores or a thin coating of lithium-containing sulfide deposited on a nano-scaled filament surface wherein the lithium-containing sulfide is in contact with said electrolyte, or dispersed or dissolved in a liquid electrolyte, and the lithium-containing sulfide-to-filament weight ratio is between 1/10 and 10/1 which is measured when said cell is in a fully discharged state;
wherein said pores contain interconnected pores that accommodate and retain lithium-containing sulfide, permitting only $Li^+$ ions to diffuse back and forth between the anode and the cathode for reduced capacity decay.

* * * * *